(12) United States Patent
Katahira et al.

(10) Patent No.: US 10,664,473 B2
(45) Date of Patent: May 26, 2020

(54) DATABASE OPTIMIZATION BASED ON FORECASTING HARDWARE STATISTICS USING DATA MINING TECHNIQUES

(71) Applicant: INTERNATIONAL BUSINESS MACHINES CORPORATION, Armonk, NY (US)

(72) Inventors: Reinaldo T. Katahira, Jundiai (BR); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 15/418,881

(22) Filed: Jan. 30, 2017

(65) Prior Publication Data
US 2018/0218038 A1 Aug. 2, 2018

(51) Int. Cl.
*G06F 16/2453* (2019.01)
*G06F 16/2458* (2019.01)

(52) U.S. Cl.
CPC .... *G06F 16/24542* (2019.01); *G06F 16/2465* (2019.01); *G06F 2209/5019* (2013.01)

(58) Field of Classification Search
CPC .......... G06F 16/2453; G06F 16/24542; G06F 16/24547; G06F 3/0653; G06F 3/122;
(Continued)

(56) References Cited

U.S. PATENT DOCUMENTS 7,877,584 B2   1/2011 Ferren et al.
8,051,421 B2  11/2011 Wylie et al.
(Continued)

FOREIGN PATENT DOCUMENTS

JP    2012243170    12/2012

OTHER PUBLICATIONS

Calandrella, Kevin P. et al.; Scalability of Rational System Architect 11.4; IBM Bluemix; Mar. 10, 2011; Retrieved from the Internet Nov. 20, 2015; URL: http://www.ibm.com/developerworks/rational/library/scalability-of-rational-system-architect-11-4/; 17 pages.

*Primary Examiner* — David T. Brooks
(74) *Attorney, Agent, or Firm* — Schmeiser, Olsen & Watts; Mark C. Vallone

(57) ABSTRACT

A method and system to optimize future performance of a database management system is provided. When a request to prepare a structured language query statement is received, historical hardware statistics data of operating parameters of a database management system is analyzed for optimization of the structured language query statement. The computer determines whether a prediction module of the computer is enabled to create a prediction of future hardware statistics data of the operating parameters of a database management system for a scheduled execution time using a predetermined data mining technique that analyzes historical statistics data. A prediction is created of the future hardware statistics data for the scheduled execution time, and a structured language query execution plan is generated using the future hardware statistics data. The structured language query statement is executed according to the structured language query execution plan at the scheduled execution time.

20 Claims, 9 Drawing Sheets

(58) Field of Classification Search
CPC .............. G06F 16/242; G06F 16/245; G06F 16/24544; G06F 16/24545; G06F 16/24549; G06F 16/24569
See application file for complete search history.

(56) References Cited

U.S. PATENT DOCUMENTS

| | | | | |
|---|---|---|---|---|
| 8,335,767 | B2 * | 12/2012 | Das | G06F 16/24542 707/661 |
| 8,380,684 | B2 | 2/2013 | Hollingsworth et al. | |
| 8,417,811 | B1 * | 4/2013 | Jenkins | G06F 11/3452 709/224 |
| 8,516,488 | B1 * | 8/2013 | Brown | G06F 9/5038 718/104 |
| 9,047,131 | B2 | 6/2015 | Benari et al. | |
| 9,372,889 | B1 * | 6/2016 | Jakobsson | G06F 16/24542 |
| 9,720,732 | B1 * | 8/2017 | Shih | G06F 9/4887 |
| 10,133,775 | B1 * | 11/2018 | Ramalingam | G06F 16/2453 |
| 2001/0013008 | A1 * | 8/2001 | Waclawski | G06F 11/3409 702/186 |
| 2005/0125427 | A1 * | 6/2005 | Dageville | G06F 16/217 |
| 2007/0050776 | A1 * | 3/2007 | Ferren | G06F 9/3844 718/104 |
| 2009/0024572 | A1 * | 1/2009 | Mehta | G06F 16/24542 |
| 2009/0281782 | A1 * | 11/2009 | Bitar | G06F 11/3409 703/21 |
| 2010/0198811 | A1 * | 8/2010 | Wiener | G06F 16/24549 707/718 |
| 2013/0226903 | A1 * | 8/2013 | Wu | G06F 16/24542 707/719 |
| 2014/0040235 | A1 * | 2/2014 | Rajan | G06F 16/24542 707/718 |
| 2014/0114951 | A1 * | 4/2014 | Sasaki | G06F 11/3419 707/715 |
| 2014/0214798 | A1 * | 7/2014 | Nica | G06F 16/24542 707/718 |
| 2014/0229221 | A1 * | 8/2014 | Shih | G06Q 10/06313 705/7.23 |
| 2015/0081669 | A1 * | 3/2015 | Belknap | G06F 16/24542 707/718 |
| 2016/0034835 | A1 * | 2/2016 | Levi | H04L 67/10 705/7.23 |
| 2018/0107696 | A1 * | 4/2018 | Moscibroda | G06F 17/18 |
| 2018/0173712 | A1 * | 6/2018 | Sharma | G06F 16/24542 |

* cited by examiner

DATABASE OPTIMIZATION BASED ON FORECASTING HARDWARE STATISTICS USING DATA MINING TECHNIQUES

TECHNICAL FIELD

The present invention relates to Database Management System (DBMS). More particularly, the present invention relates to optimizing future performance of a DBMS based on a forecast of hardware statistics using data mining techniques.

BACKGROUND

Various kinds of database have been in use since the early days of electronic computing. In order to store and retrieve data from the database, a database management system (DBMS) is used. The database management system is a set of software programs that are linked to one or more database. As electronic commerce has gained prevalence, organizations have become increasingly dependent on database management systems for processing ever larger volumes and more critical nature of electronic data. A failure of these database management systems can potentially result in a huge loss of money. Moreover, loss of such data may lead to dissatisfaction of customers and depreciate the market value of the organization. Hence, it is critically important to ensure high reliability of such database management systems.

The challenge faced by the operators and system administrators of such database management systems is how to detect and diagnose performance problems with the database management system in a timely manner, before the problem reaches a critical stage and results in a system failure.

The performance of the database management system depends on various operating parameters such as memory usage, CPU time, and caching. The operating parameters govern effective usage of the database management system. One approach to address the aforementioned problem is to convert historical data of the operating parameters into meaningful recommendations and warnings of the performance of the database management system. Some of the current database management systems, such as Oracle, only provides current trend with low reliability.

SUMMARY

The present invention relates to a method and system to optimize future performance of a Database Management System (DBMS). The method comprises receiving, by a computer, a request to prepare a structured language query statement, and analyzing, by the computer, historical hardware statistics data of one or more operating parameters of a database management system for optimization of execution of the structured language query statement. The computer determines whether a prediction module of the computer is enabled, wherein the prediction module is adapted to create a prediction of future hardware statistics data of the one or more operating parameters of a database management system for a scheduled execution time using a predetermined data mining technique that analyzes historical statistics data of the database management system. The prediction is created of the future hardware statistics data for the scheduled execution time, and a structured language query execution plan is generated for the structured language query statement using the future hardware statistics data. The structured language query statement is executed according to the structured language query execution plan at the scheduled execution time.

BRIEF DESCRIPTION OF THE DRAWINGS

The above and other items, features and advantages of the invention will be better understood by reading the following more particular description of the invention in conjunction with the accompanying drawings, wherein.

DETAILED DESCRIPTION

Figure 1:
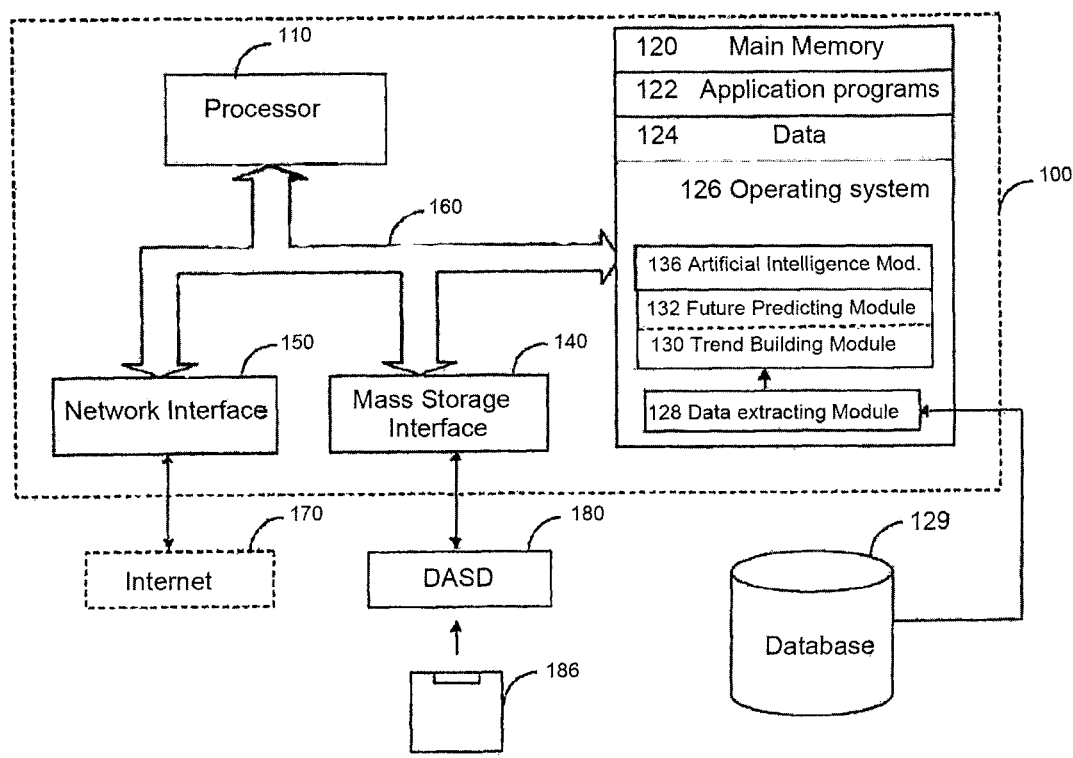
FIG. 1 illustrates a computer system used as a Database management system in accordance with an embodiment of the present invention.

An execution plan is the result of the query optimizer's attempt to calculate the most efficient way to implement the request represented by the T-SQL query. Execution plans can tell one how a query will be executed, or how a query was executed. A generated execution plan, known as a Query Execution Plan is input for the SQL Server storage engine to tell it how to execute the query. An execution plan is the real work plan generated by the query optimizer to determine how to process or execute a submitted query.

When one submits a query to a SQL Server database, a number of processes on the server go to work on the submitted query. The purpose of all these processes is to manage the system such that the will provide one's data back, or store the data, in as timely a manner as possible, whilst maintaining the integrity of the data. The processes are run for each and every query submitted to the system.

In the relational engine the query is parsed and then processed by the query optimizer, which generates an execution plan. The plan is sent (in a binary format) to the storage engine, which the storage engine then uses to retrieve or update the underlying data.

A Transact-SQL (T-SQL) is a set of programming extensions that add several features to Structured Query Language (SQL) including transaction control, exception and error handling, row processing, and declared variables. When one passes a T-SQL query to the SQL Server system, the first place the query goes to is the relational engine. As the T-SQL arrives, the T-SQL passes through a process that checks that the T-SQL is written correctly; a process known as query parsing. The output of the parser process is a parse tree, or query tree (or even sequence tree). The parse tree represents the logical steps necessary to execute the query that has been requested.

The query optimizer is essentially a piece of software that "models" the way in which the database relational engine works. Using the query processor tree and the data statistics, the optimizer works out the optimal way to execute the query; i.e., an execution plan is generated.

The optimizer figures out how best to implement the request represented by the submitted T-SQL query. Typically, the decisions made by the optimizer are based on calculated costs of a given execution plan, in terms of the required CPU processing and I/O, and how fast the query will execute.

The optimizer will generate and evaluate many plans (unless there is already a cached plan) and, generally speaking, will choose the lowest-cost plan i.e. the plan that will execute the query as fast as possible and use the least amount of resources, CPU and I/O. The calculation of the execution speed is the most important calculation and the optimizer will use a process that is more CPU-intensive if it will return results that much faster. Sometimes, the optimizer will select a less efficient plan if the optimizer determines the query will take more time to evaluate many plans than to run a less efficient plan.

Statistics are collected on columns and indexes within the database, and describe the data distribution and the uniqueness, or selectivity of the data. The information that makes up statistics typically is represented by a histogram, a tabulation of counts of the occurrence of a particular value, taken from data points evenly distributed across the data.

If statistics exist for a relevant column or index, then the optimizer will use them in the calculations. Statistics, by default, are created and updated automatically within the system for all indexes or for any column used as a predicate, as part of a WHERE clause or JOIN ON clause. Table variables typically do not have statistics generated on them, so tables are assumed by the optimizer to have a single row, regardless of their actual size. Temporary tables do have statistics generated on them and are stored in the same histogram as permanent tables, for use within the optimizer.

The optimizer takes the statistics, along with the query processor tree, and heuristically determines the best plan. This means that the optimizer works through a series of plans, testing different types of join, rearranging the join order, trying different indexes, and so on, until the optimizer arrives at what the optimizer determines to be the fastest plan. During these calculations, a number is assigned to each of the steps within the plan, representing the optimizer's estimation of the amount of time the optimizer thinks that step will take.

Once the optimizer arrives at an execution plan, the actual plan is created and stored in a memory space known as the plan cache—unless an identical plan already exists in the cache. As the optimizer generates potential plans, the compares them to previously generated plans in the cache. If the finds a match, the optimizer will use that previously generated plan.

In computer science, concurrency is the decomposability property of a program, algorithm, or problem into order-independent or partially-ordered components or units. If the concurrent units of the program, algorithm, or problem are executed out-of-order or in partial order, the final outcome will remain the same, which allows for parallel execution of the concurrent units, which can significantly improve overall speed of the execution in multi-processor and multi-core systems.

A number of mathematical models have been developed for general concurrent computation including Petri nets, process calculi, the Parallel Random Access Machine model, the Actor model and the Reo Coordination Language.

Because computations in a concurrent system can interact with each other while being executed, the number of possible execution paths in the system can be extremely large, and the resulting outcome can be indeterminate. Concurrent use of shared resources can be a source of indeterminacy leading to issues such as deadlocks, and resource starvation.

Design of concurrent systems often entails finding reliable techniques for coordinating execution, data exchange, memory allocation, and execution scheduling to minimize response time and maximize throughput.

By way of example, there are many directions algorithms in the market but they all share one feature, the previously gathered data; e.g., a street's speed limit, traffic lights, latitude and longitude coordinates and other elusive information in order to decide for the best direction. In the SQL (Structured Query Language) context, one may encounter a similar decision tree in which the statistics have a prominent role to formulate an optimal database access path or execution plan. Hardware statistics provide vital information to the state-of-the-art SQL optimizer and in many Relational Database Management Systems (RDBMS) with the CPU speed, IO seek time, IO transfer time, IO rotation delay, single block read time, multiple block read time (which stands for the predetermined size read time in DB2) and the maximum number of slave threads being known, query optimizations may be adopted. The system concurrency may dramatically change those mentioned capacities; therefore, queries may be adapted accordingly.

Currently, in order to set these statistics, at very least, a workload must be gathered during a certain period, consuming time and hardware resources. Instead of gathering statistics every time in the conventional manner, one can forecast all the hardware resources statistics and formulate optimal queries during the parse stage even before the SQL query execution.

By way of example, when Oracle get a SQL query, the Oracle system needs to execute some tasks before being able to really execute the query. These tasks make up what is called parsing. To execute the query and limit the number of data that the system must rebuilt each time, Oracle uses a shared memory area named the shared pool.

Oracle keeps SQL statements, packages, information on the objects and many other things in a memory area named shared pool. This memory area is managed in a complex way by Oracle but the used memory is not freed when a user completed an action using the used memory. The purpose of the shared area is to maximize the sharing and the reuse of the information. The information created in memory for a session can be useful to another session but Oracle cannot know a priori if one set of information will be or not useful to another session so Oracle keeps everything even if older information is removed to make space.

Many databases are used as online transaction processing (OLTP) during day time and similar to a decision support system (DSS) environment during the night. Therefore, hardware statistics typically are gathered every day to deal with this situation. Other databases are constantly accessed all week long and quiet time settles only during the weekends. Data mining algorithms such as Decision Tree can detect all those subtle changes and thus forecast hardware statistics accordingly. Using these subtleties, the system of this invention may use the forecasts to optimize the optimal run times for certain queries.

According to the present invention, multiple points of past hardware statistics may be analyzed to provide a data trend that can be recognized via a decision tree algorithm, or other know classification data mining algorithms. The data trend is analyzed and the rules are output of the relevant algorithm.

Using the previously generated rules, one can determine the condition of the hardware at the scheduled execution time, in the future, and then adapt the SQL execution plan accordingly. The current state of the art of RDBMs does not provide for a future adaptability feature. The SQL execution plan optimizers discussed above are proprietary mechanisms that certain companies have developed; e.g., Oracle, IBM DB2, Microsoft SQL Server, Teradata. However, current optimizers implement a proposed strategy without changing the current SQL execution plan optimizer internal mechanism. The present invention provides a unique input of hardware statistics as part of the optimizer trend analysis and execution plan generation.

The method set forth herein forecasts hardware statistics for database optimization using data mining techniques based upon previously gathered hardware statistics, thus saving time and hardware resources. A number of innovative aspects of the invention include: (1) forecasting hardware statistics instead of gather hardware statistics every time a user wishes to access a database; (2) converting calendar events into input data argument; and (3) using data mining techniques to forecast and/or gather hardware statistics.

Many RDBMS gather hardware statistics; e.g., Oracle, but no one currently predicts hardware statistics from previous hardware statistics.

For convention scenarios, a partial period of the execution analysis provides a reasonable sample to estimate statistics. The execution analysis is typically taken before the end of the whole busy period to let the subsequent queries take advantage of the findings; however, the accuracy of this approach is sometimes questionable because the whole busy period was not completely assessed. Prediction algorithms might be used to estimate the whole busy period and assume subtle changes accordingly based on previous observations. Busy periods and quiet periods are determined and defined by time and cost analysis for running a particular SQL execution plan.

The present invention would now be explained with reference to the accompanying figures. Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The present invention may take the form of an entirely hardware embodiment, an entirely software embodiment or an embodiment containing both hardware and software elements. In accordance with an embodiment of the present invention, the invention is implemented in software, which includes, but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and DVD.

FIG. 1 depicts a block diagram of a computer system 100 used as a database management system (DBMS) in accordance with an embodiment of the present invention, which includes a processor 110, a main memory 120, a mass storage interface 140, and a network interface 150, all connected by a system bus 160. Those skilled in the art will appreciate that this system encompasses all types of computer systems: personal computers, midrange computers, mainframes, etc. Note that many additions, modifications, and deletions may be made to this computer system 100 within the scope of the invention. Examples of possible additions include: a display, a keyboard, a cache memory, and peripheral devices such as printers.

Processor 110 may be constructed from one or more microprocessors and/or integrated circuits. Processor 110 executes program instructions stored in main memory 120. Main memory 120 stores programs and data that computer system 100 may access. Main memory 120 includes one or more application programs 122, data 124, operating system 126, data extracting module 128 extracting the historical data from a database 129, trend building module 130, future predicting module 132 and artificial intelligence module 136. When computer system 100 starts, processor 110 initially executes the program instructions that make up operating system 126. Operating system 126 manages the resources of computer system 100 for example, processor 110, main memory 120, mass storage interface 140, network interface 150 and system bus 160.

Application programs 122 are executed by processor 110 under the control of operating system 126. Application programs 122 may be run with program data 124 as input. Application programs 122 may also output their results as program data 124 in main memory. In one embodiment of the present invention, computer system 100 includes data extracting module 128 to extract the historical data of at least on operating parameter from database 129. Computer system 100 also includes trend building module 130 to build a trend of the historical data for each of the operating parameters and a future predicting module 132 to predict future performance of a Database management system (DBMS). The "modules" are software codes that may be a callable routine or embedded into another program, i.e., an operating system or application program. For example, although the modules are shown as a part of operating system 126 in accordance with one embodiment of the invention, it is equally within the scope of the present invention to provide a separate software application or utility that could also provide data extracting module 128, trend building module 130, future predicting module 132 and artificial intelligence module 136. In accordance with an embodiment of the present invention, the modules may be provided as independent modules. In accordance with another embodiment of the present invention, the modules may be clubbed together.

The database system may be monitored automatically, such as by an artificial intelligence module 136. The artificial intelligence module may include an optimizer that may analyze the current performance of the database system hardware configuration and suggest an improved hardware configuration to the system administrator. The optimization may use any suitable optimization technique and may be bounded in any suitable manner, such as by timing of hardware updates, monetary budgets, and the like.

Mass storage interface 140 allows computer system 100 to retrieve and store data from auxiliary storage devices such as magnetic disks (hard disks, diskettes) and optical disks (CD-ROM). These mass storage devices 180 are commonly known as Direct Access Storage Devices (DASD), and act as a permanent store of information. One suitable type of DASD 180 is a floppy disk drive 180 that reads data from and writes data to a floppy diskette 186. The information from the DASD may be in many forms. Common forms are application programs and program data. Data retrieved through mass storage interface 140 is usually placed in main memory 120 where processor 110 may process it.

While main memory 120 and DASD 180 are typically separate storage devices, computer system 100 may use well known virtual addressing mechanisms that allow the programs of computer system 100 to run smoothly as if having access to a large, single storage entity, instead of access to multiple, smaller storage entities (e.g., main memory 120 and DASD device 180). Therefore, while certain elements are shown to reside in main memory 120, those skilled in the art will recognize that these are not necessarily all completely contained in main memory 120 at the same time. It should be noted that the term "memory" is used herein to generically refer to the entire virtual memory of computer system 100. In addition, an apparatus in accordance with the present invention may include any possible configuration of hardware and software that contains the elements of the invention, whether the apparatus is a single computer system or is comprised of multiple computer systems operating in sync with each other.

Network interface 150 allows computer system 100 to send and receive data to and from any network connected to computer system 100. This network may be a local area network (LAN), a wide area network (WAN), or more specifically, the Internet 170. Suitable methods of connecting to a network include known analog and/or digital techniques, as well as networking mechanisms that are being developed or may be developed in the future. Various different network protocols may be used to implement a network. These protocols are specialized computer programs that allow computers to communicate across a network. TCP/IP (Transmission Control Protocol/Internet Protocol), used to communicate across the Internet, is an example of a suitable network protocol.

System bus 160 allows data to be transferred among the various components of computer system 100. Although computer system 100 is shown to contain only a single main processor and a single system bus, those skilled in the art will appreciate that the present invention may be practiced using a computer system that has multiple processors and/or multiple buses. In addition, the interfaces that are used in the preferred embodiment may include separate, fully programmed microprocessors that are used to off-load compute-intensive processing from processor 110, or may include I/O adapters to perform similar functions.

In accordance with the invention, the database structure is not altered and only the SQL queries execution plans are adapted to future hardware utilization conditions. The invention proposes a less intrusive approach than optimized configuration of the hardware resource for a processor, because an SQL query execution plan is adapted based on the predicted hardware utilization. No new hardware resources are allocated and no software is installed. The invention predicts overall hardware utilization of the entire server when the query will be executed and thus optimizes the SQL query execution plan accordingly.

In one embodiment, a Decision Tree algorithm (see below), which is commonly applied in Classification Data Mining for business intelligence, may be used. The previously gathered hardware statistics is preferably the input dataset for the Decision Tree prediction, which may take only few seconds, to provide the estimate in comparison to the minutes or hours spent in the partial workload assessment. In this exemplary embodiment, the data breakdown is simplified but it will be understood by those of skill in the art that the prediction may be used to drill down on details that will improve system optimization.

In one embodiment, queries may be parsed during the quiet period but they would be executed under the busy period timeframe which may run optimally. According to the invention, the optimal query might be parsed even before the busy time takes place due to the fact that the Decision Tree statistics prediction has already estimated it. Thus, many applications where gathering hardware statistics step is relevant for performance may benefit from this invention.

Currently, database management systems parse the SQL query at the executed time or at the compilation time. In both scenarios, the system utilizes statistics collected in the past to optimize the query. The present invention proposes a parsing method using forecast statistics for a future scenario when the query will actually run. For example, the system 100 may have one optimized SQL execution plan during a quiet period when access to the disk IO is fully available. However, the same execution plan may not be optimal for a busy period; therefore, using data mining techniques; e.g., a data mining algorithm, the invention may anticipate the utilization of disk IO optimize the SQL execution plan to a future scenario that will be more efficient. A majority of the time savings is realized during execution time.

By way of example, the following query has been performed using Oracle 11g:

```
SELECT *
FROM
    sh.sales s,
    sh.customers c
```

```
WHERE
    s.cust_id = c.cust_id
    and s.cust_id between 1 and 200
With IOSEEKTIM = 1 (average IO Seek time for positioning the head into the desired location of the disk)
exec dbms_stats.set_system_stats(pname=>'IOSEEKTIM', pvalue=>1)
```

| Id  | Operation                     | Name           | Rows | Bytes | Cost(%CPU) |     | Time     | Pstart | Pstop |
|-----|-------------------------------|----------------|------|-------|------------|-----|----------|--------|-------|
| 0   | SELECT STATEMENT              |                | 193  | 43039 | 638        | (1) | 00:00:02 |        |       |
| * 1 | HASH JOIN                     |                | 193  | 43039 | 638        | (1) | 00:00:02 |        |       |
| 2   | TABLE ACCESS BY INDEX ROWID   | CUSTOMERS      | 169  | 32786 | 168        | (0) | 00:00:01 |        |       |
| * 3 | INDEX RANGE SCAN              | CUSTOMERS_PK   | 169  |       | 2          | (0) | 00:00:01 |        |       |
| 4   | PARTITION RANGE ALL           |                | 1931 | 55999 | 469        | (1) | 00:00:02 | 1      | 28    |
| 5   | TABLE ACCESS-LOCAL INDEX ROWID| SALES          | 1931 | 55999 | 469        | (1) | 00:00:02 | 1      | 28    |
| 6   | BITMAP CONVERSION TO ROWIDS   |                |      |       |            |     |          |        |       |
| * 7 | BITMAP INDEX RANGE SCAN       | SALES_CUST_BIX |      |       |            |     |          | 1      | 28    |

```
With IOSEEKTIM = 10
exec dbms_stats.set_system_stats(pname=>'IOSEEKTIM', pvalue=>10)
```

| Id  | Operation                   | Name         | Rows | Bytes | Cost(%CPU) |     | Time     | Pstart | Pstop |
|-----|-----------------------------|--------------|------|-------|------------|-----|----------|--------|-------|
| 0   | SELECT STATEMENT            |              | 193  | 43039 | 485        | (2) | 00:00:06 |        |       |
| * 1 | HASH JOIN                   |              | 193  | 43039 | 485        | (2) | 00:00:06 |        |       |
| 2   | TABLE ACCESS BY INDEX ROWID | CUSTOMERS    | 169  | 32786 | 168        | (0) | 00:00:03 |        |       |
| * 3 | INDEX RANGE SCAN            | CUSTOMERS_PK | 169  |       | 2          | (0) | 00:00:01 |        |       |
| 4   | PARTITION RANGE ALL         |              | 1931 | 55999 | 317        | (3) | 00:00:04 | 1      | 28    |
| * 5 | TABLE ACCESS FULL           | SALES        | 1931 | 55999 | 317        | (3) | 00:00:04 | 1      | 28    |

As evident by this example, the cost and time of the same query changed dramatically accordingly to the estimate average IO seek time for positioning the head into the desired location of the disk. In addition, the whole execution plan has changed accordingly. Even though IO seek time, IO rotation delay and IO transfer time are in theory constant per disks, other aspects involved in the system concurrency are taken into the consideration, in Oracle 11g RDBMS, which modifies supposedly constant values in order to better reflect query costs in the determined timeframe.

In order to provide a reasonable estimate for hardware resource condition, one may identify the hardware utilization trends. The hardware utilization trends are usually closely related to calendar structure; therefore, the exemplary timestamp has been split into numeric fields (day, month, year, etc.) and the week day (Sunday, Monday, Tuesday, Wednesday, Thursday, Friday and Saturday) introduced as input data argument (along with holiday converted into Boolean true or false input data argument). Indeed, there is a strong correlation between calendar events, such as holidays, weekends, end of quarters, etc., and human consumption of system services. The invention proposes to convert, for example, the days of the week into a corresponding number and a holiday into a flag. Thus, the days of the week may be assigned a number; e.g., Sunday=1, Monday=2, Tuesday=3, Wednesday=4, Thursday=5, Friday=6, and Saturday=7, and a holiday may be labeled "true" while a non-holiday may be labeled "false".

Figure 2:
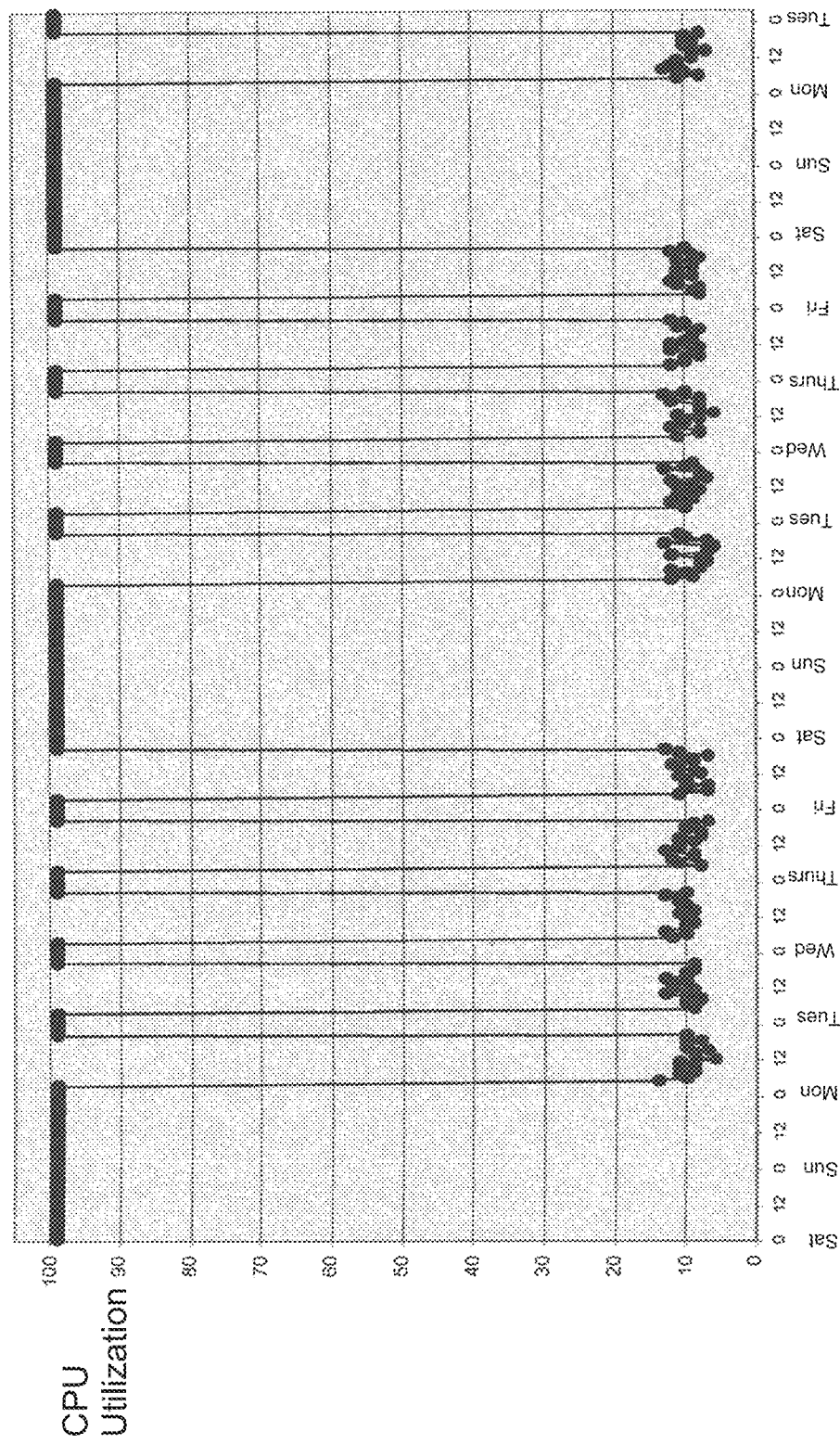
FIG. 2 is an exemplary CPU utilization graph in accordance with an embodiment of the present invention.

FIG. 2 is an exemplary CPU utilization graph in accordance with an embodiment of the present invention. The CPU utilization graph of FIG. 2, where x axis marks stands for 0:00 midnight and 12:00 noon by day, starts at 2010 May 1 00:00 (Saturday) until 2010 May 18 03:00 (Tuesday) and as FIG. 2 shows the system 100 uses 99% CPU all weekend long. During the day time of the week the utilization goes down to 10% and goes up to 99% again during the night. Of course, the system 100 proposed by this invention may perform more detailed and specific analyzes; for example, by the minute or second.

Figure 3:
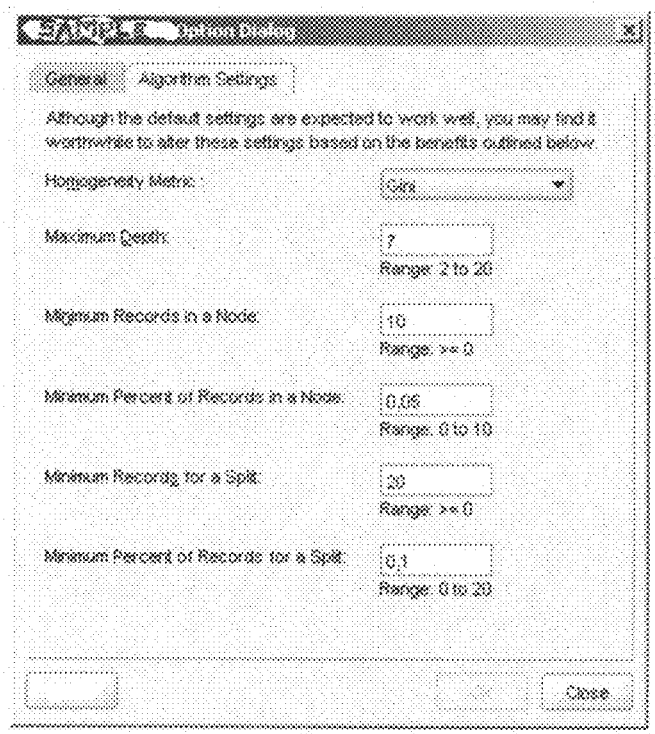
FIG. 3 illustrates dialog box showing exemplary settings for an algorithm in accordance with an embodiment of the present invention.

FIG. 3 illustrates dialog box showing exemplary settings for an algorithm in accordance with an embodiment of the present invention. Given the day of the week, day and hour using Decision Tree model for CLASSIFICATION on all the training points above produces the settings and respective predictions shown in FIG. 3.

Figure 4:
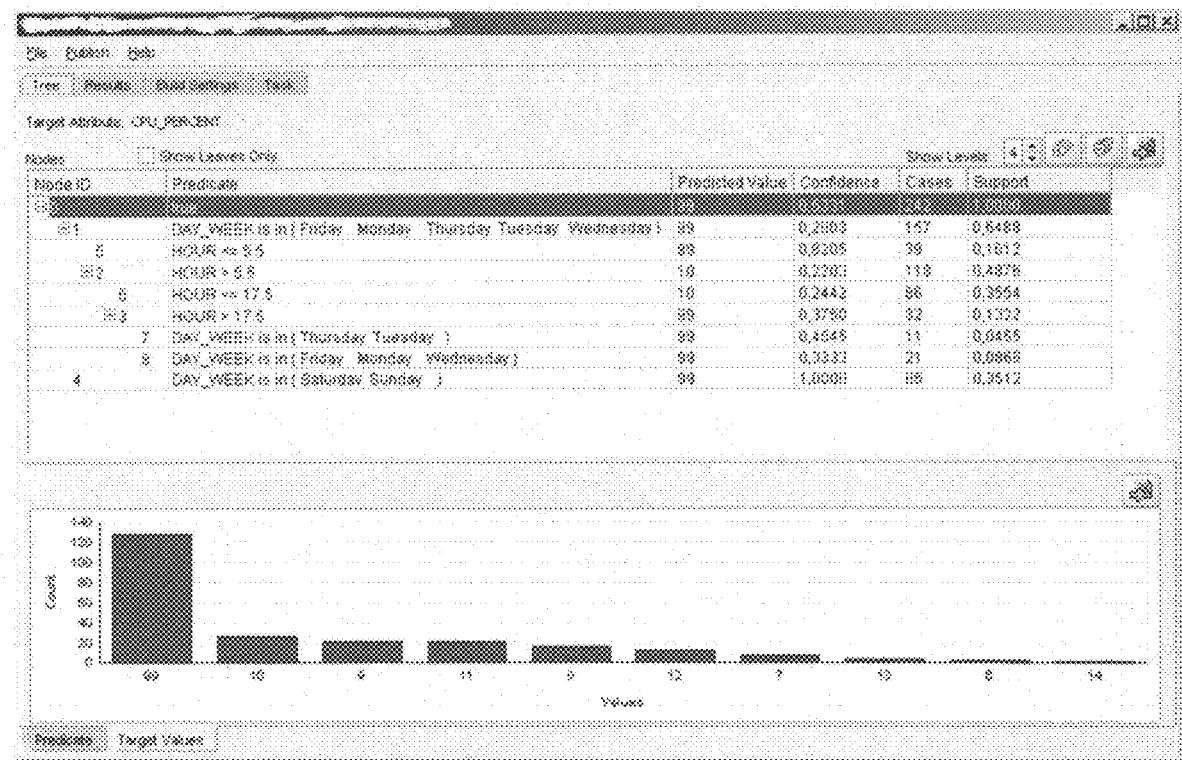
FIG. 4 illustrates an exemplary activity result viewer showing the node IDs, predicates, and predicted values related to an exemplar algorithm in accordance with an embodiment of the present invention.

FIG. 4 illustrates an exemplary activity result viewer showing the node IDs, predicates, and predicted values related to an exemplar algorithm in accordance with an embodiment of the present invention. In the illustration of FIG. 4, one may highlight "PREDICATE" and "PREDICTED VALUE" columns. The "PREDICATE" column shows the detected rules for the decision tree and "PREDICTED VALUE" column shows the most probable CPU utilization percentage at that timeframe. For example, the leaf node id 5 is under node id 1 therefore its rule is defined by "PREDICATE" node id 1 and "PREDICATE" node id 5 which stands for "DAY_WEEK in {Friday, Monday, Thursday, Tuesday, Wednesday}" and "HOUR<=5.5" hence every business day from midnight till 5:30 AM the CPU utilization is predicted 99%, matching the actual CPU utilization graph.

As exemplified by FIG. 4, a reasonable prediction for CPU utilization is provided, which is a vital finding for the SQL query optimizer. The same Decision Tree technique can be applied for all the other hardware statistics such as IO seek time, IO transfer time and any other parameters that might influence the execution plan. Even though in DB2 the overhead (IO seek time plus IO rotational delay) and transfer rate (IO transfer time) are considered and fixed by table space the overall response time may vary due to the concurrency and other hardware conditions such as CPU run queue length. When all of these hardware statistics are analyzed and combined, the SQL query execution plan may be adapted for optimization. Of course, the foregoing list of hardware features, where statistical analysis is appropriate, is only provided by way of example and may be expanded.

In at least one embodiment, a normalization (i.e., a conventional data mining technique) step is used to lower bound from 0 to upper bound 100 and round (or even ceil or floor) all the hardware statistics values to narrow down the possible classification values and thus optimize the Decision Tree algorithm.

In the Decision Tree algorithm the impurity level of the sample data over the target attribute is calculated using either Gini index or Entropy, as follows:

$$\text{Gini\_Index} := 1 - \sum_{n} p_n^2$$

$$\text{Entropy} := \sum_{n} -p_n \log_2(p_n)$$

where n is the number of possible classes within a specific attribute and p is the probability of the occurrence in the determined sample.

There are many decision tree algorithms such as CART that uses Gini index and ID3, C4.5, C5.0 that use information gain based on entropy. Used by the CART (classification and regression tree) algorithm, Gini impurity is a measure of how often a randomly chosen element from the set would be incorrectly labeled if it was randomly labeled according to the distribution of labels in the subset. Used by the ID3, C4.5 and C5.0 tree-generation algorithms, information gain is based on the concept of entropy from information theory as will be understood by those of skill in the art. An example is provided below:

$$\text{Information\_gain}(\text{Sample, Attribute}) :=$$

$$\text{Entropy}(\text{Sample}) - \sum_{i=1}^{j} \text{Entropy}(\text{Subset})$$

where the information gain of an attribute over a sample is calculate by the entropy of the sample minus the entropy sum of all the subsets split by classes.

The information gain of all the attributes of the sample data is calculated and the higher gain attribute will be the key to split the remaining sample data; thus, the rules for the decision tree are recursively formulated.

The present invention provides a method for forecasting the future performance of a database management system (DBMS). On basis of the hardware utilization forecast, the operator can take one or more corrective actions, to reduce the chances of a system failure or poor system performance. The performance of the DBMS depends on various operating parameters of the DBMS. The operating parameters may include memory usage, CPU time, transactions per time, file system fill grade, transaction log space used, CPU utilization, disk utilization, buffer pool hit ratio at database level, table space level, buffer pool level and caching. These operating parameters govern the effective usage of the DBMS during interaction of the operator. In accordance with an embodiment of the present invention, the forecast of the future performance of the DBMS is provided to the operator by predicting future values of the operating parameters.

Trend analysis or time series techniques are applied to predict the future values of the operating parameters. Trend analysis or time series analysis is known to predict and forecast future values of different variables in a huge number of domains. The domains include traffic analysis, market research, stock market analysis and prediction, finance, politics (such as election campaigns), population study, economics, crime analysis and forensic applications, chemistry, geographical and geological analysis, medical data analysis, web intelligence, intrusion detection, sequential data mining and various other fields. The method of an embodiment of the present invention forecasts the future value of the operating parameters on the basis of the trend of data points of historical data of the operating parameters. The data points of historical data are past values of the operating parameters.

Figure 5:
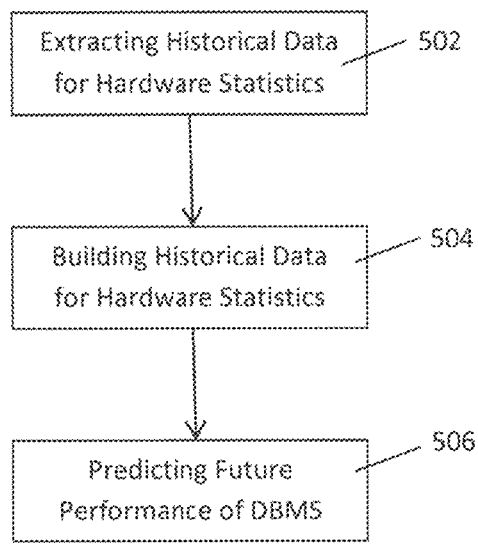
FIG. 5 is an overview flow chart illustrating a method of forecasting the future performance of the DBMS in accordance with an embodiment of the present invention.

FIG. 5 is an overview flow chart illustrating a method of forecasting the future performance of the DBMS in accordance with an embodiment of the present invention. At step 502, historical statistics of the operating parameters is extracted and gathered from the database as a hardware statistics workload. The historical statistics of the operating parameters is gathered at predetermined time intervals from the DBMS system. The time interval is the duration between two consecutive observations of the operating parameters. It is "chunk-wise" constant and may vary depending on the nature of the operating parameters. "Chunk-wise" is defined as an entire time series partitioned into multiple chunks of same size, such that the time interval in each chunk is constant. Further, the time interval may also vary or change over the time on the basis of usage pattern of the operating parameters and the operator requirements. At step 504, a forecast of hardware utilization is conducted as described above. Step 504 builds a mathematical model of the optimization trends on the basis of the historical statistics extracted at step 502, and the future performance of the DBMS is forecasted on the basis of forecasted future values of the operating parameters. The future values are forecasted using the trend of the historical data.

Figure 6:
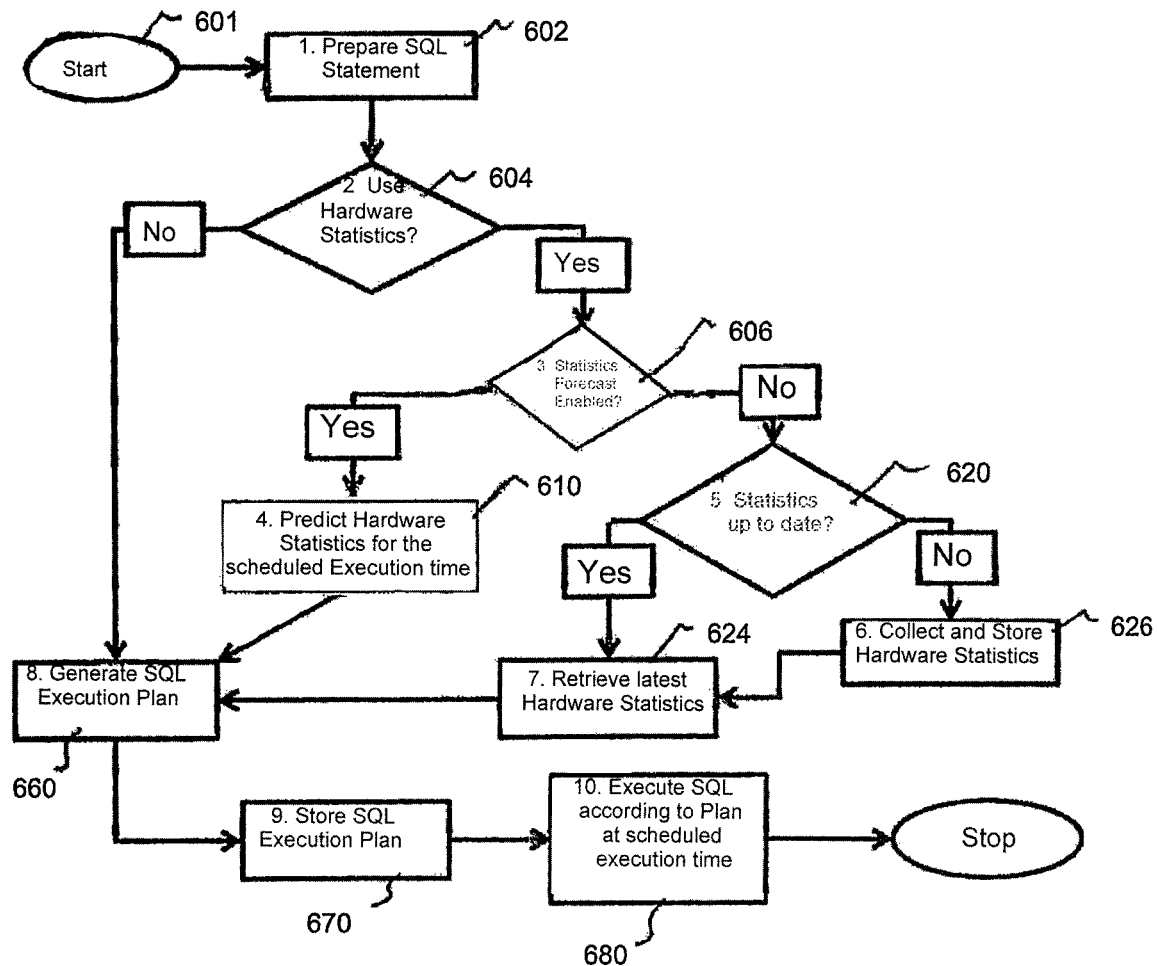
FIG. 6 is a flowchart of steps to accomplish database optimization using a forecast or prediction of hardware statistics in accordance with an embodiment of the present invention.

FIG. 6 is a flowchart of steps to accomplish database optimization using a forecast or prediction of hardware statistics in accordance with an embodiment of the present invention. The invention starts at step 601 by receiving a request to prepare a structured language query statement. It is known by those of skill in the art that the SQL statement must be parsed. At step 602, the system 100 begins to prepare the SQL statement and at step 604 determines whether to use the hardware statistics for optimization of the structured language query statement. Generally, hardware statistics may or may not be taken into consideration for SQL optimization. If a decision is made at step 604 not to use hardware statistics for preparation of the SQL statement, then the system proceeds directly to step 660 where the SQL execution plan is generated according to conventional techniques. If, on the other hand, a decision is made at step 604 to use hardware statistics for preparation of the SQL statement, the system 100 determines whether the system 100 is enabled for hardware statistics forecasting or predicting at step 606. The present invention proposes to predict hardware statistics rather than simply gathering hardware statistics to generate the SQL execution plan for the reasons discussed above with respect to the algorithm(s) and associated optimization techniques.

If the hardware statistics feature of this invention is enabled at step 606, the system 100 predicts hardware statistics for a scheduled execution time at step 610. In accordance with this invention, the system 100 uses analytics to predict the statistics of the relevant hardware even before the execution time, thus saving precious time at the actual execution time. It is noted that the analytics may be, for example, time-based set forth above with respect to FIGS. 2-4 to predict different hardware run times at different times of the day or week. The analytics may determine a specific hours or minute or second when a particular SQL statement may be optimized. The specific optimization may provide dramatic improvements in execution time or may provide modest improvements in execution time. Regardless, the prediction of statistics prior to execution time may enable the system 100 to save precious time to varying degrees. Based on the predicted hardware statistics at step 610, the system then generates the requisite SQL execution plan at step 660.

If, on the other hand, it is determined at step 606 that the statistics forecast feature is not enabled, the system proceeds to step 620 where it is determined whether the hardware statistics is current and up-to-date. If the hardware statistics are up to date, the system proceeds to step 624 where the system 100 retrieves the latest stored hardware statistics. Then, the system 100 proceeds to step 660 where the system 100 generates the SQL execution plan without the benefit of hardware statistics forecasting or prediction. If the hardware statistics are not up to date, the system proceeds to step 626 where the system 100 collects and stores the latest stored hardware statistics, then the system 100 proceeds to step 624 where the system 100 retrieves the latest stored hardware statistics. Once collection and retrieval of the hardware statistics is accomplished at steps 624, 626, the system again proceeds to step 660 where the SQL statement is generated without the benefit of hardware statistics forecasting or prediction.

Once the SQL statement is generated at step 660, regardless of whether the system 100 has the benefits of hardware statistics forecasting, the system 100 then stores the SQL execution plan at step 670 and executes the SQL statement according to the stored plan at the scheduled execution time at step 680.

As set forth above, the method of this invention forecasts hardware statistics for database optimization using data mining techniques based upon previously gathered hardware statistics, thus saving time and hardware resources. A number of aspects of the invention include: (1) forecasting hardware statistics instead of gather hardware statistics every time a user wishes to access a database; (2) converting calendar events into input data argument; and (3) using data mining techniques to forecast and/or gather hardware statistics. Many RDBMS gather hardware statistics; e.g., Oracle, but no one currently predicts hardware statistics from previous hardware statistics.

Figure 7:
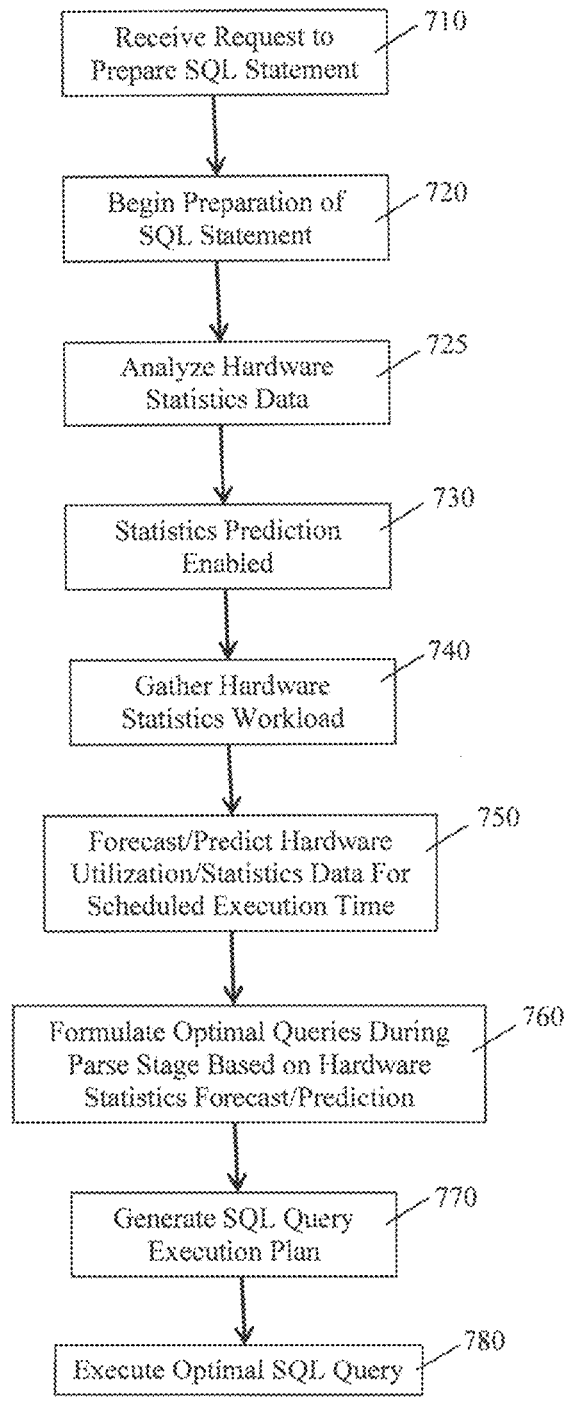
FIG. 7 is a flowchart showing steps to accomplish database optimization using a forecast or prediction of hardware statistics in accordance with another embodiment of the present invention.

Conventionally, a partial period of the execution analysis provides a reasonable sample to estimate statistics. The exemplary execution analysis is typically taken before the end of the whole busy period to let the subsequent queries take advantage of the findings; however, the accuracy of this approach is sometimes questionable because the whole busy period was not completely assessed. Prediction algorithms might be used to estimate the whole busy period and assume subtle changes accordingly based on previous observations. FIG. 7 is an overview flowchart showing steps to accomplish database optimization using a forecast or prediction of hardware statistics in accordance with another embodiment of the present invention. At step 710, the system 100 receives a request to prepare a structured language query statement. In response to that request to prepare a structured language query statement at step 710, the system begins to prepare the SQL statement at step 720. Then, the system 100 determines at step 725 whether to use hardware statistics data for optimization of the structured language query statement; i.e., whether a prediction of the hardware statistics data is enabled. After the hardware statistics have been analyzed at step 725, it is determined whether or not the prediction aspect of the hardware statistics data is enabled at step 730. The system 100 at step 740 gathers the hardware statistics and predicts the hardware statistics data for a scheduled execution time using a predetermined data mining technique to analyze historical statistics at step 750. At step 760, the system 100 formulates the optimal queries during the parse stage based on the prediction conducted at step 750, and the system generates a structured language query execution plan for said structured language query statement at step 770 using the prediction of the hardware statistics data. Lastly, the system 100 at step 780 executes the structured language query statement according to the structured language query execution plan at the scheduled execution time.

Figure 8:
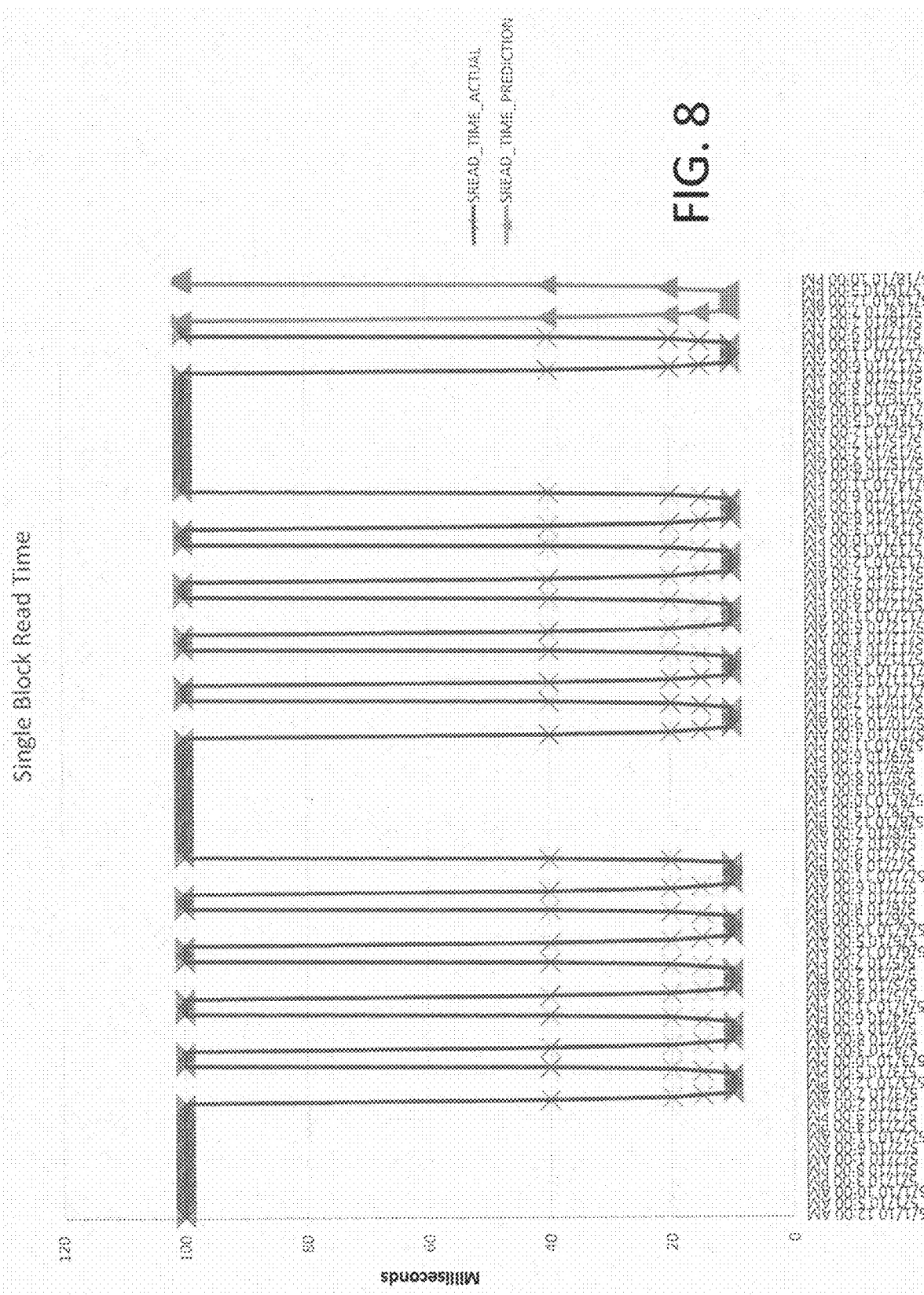
FIG. 8 is a graph illustrating data for an average time to read a single block IO from the data storage in accordance with an embodiment of the present invention.
Figure 9:
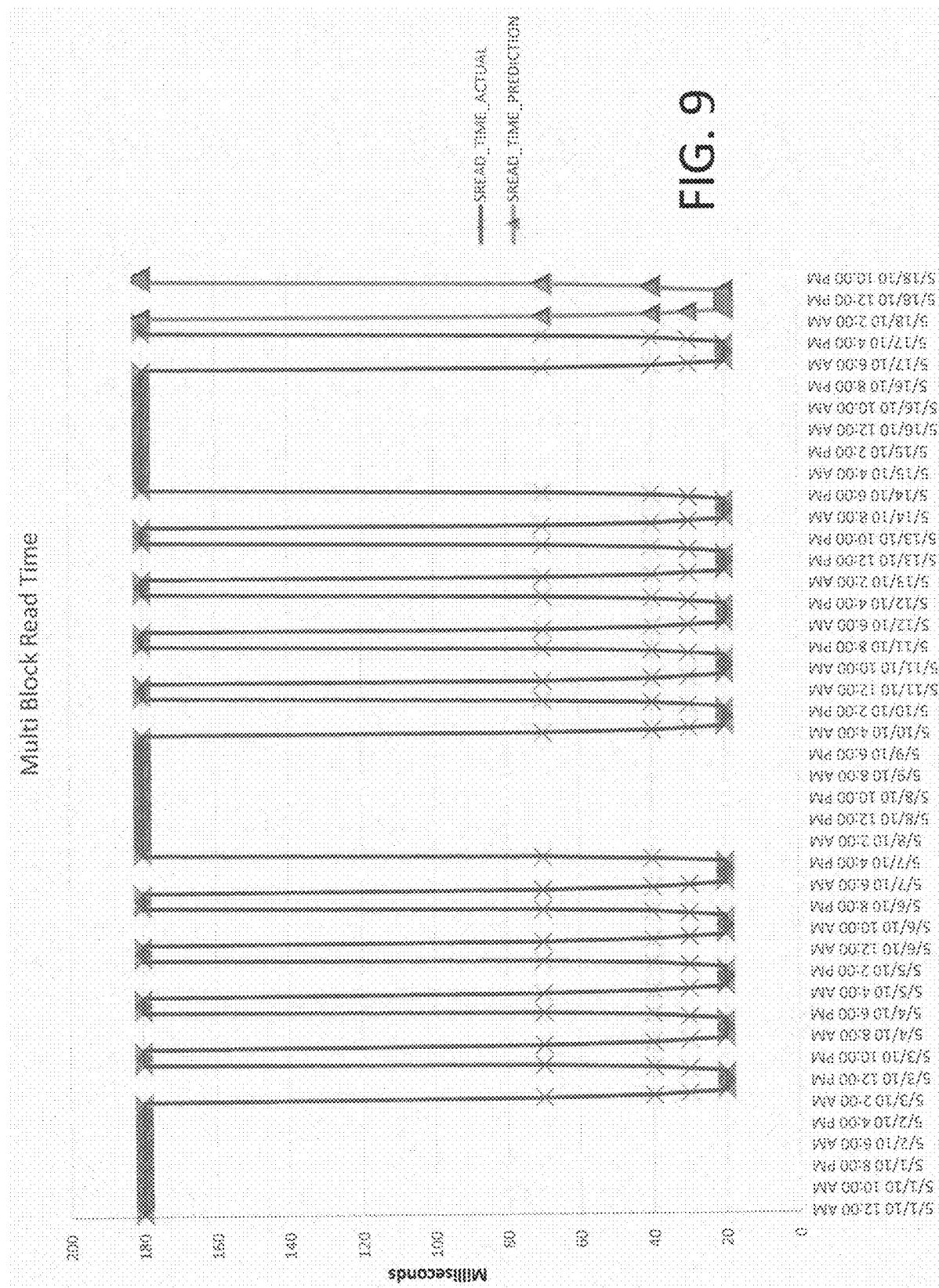
FIG. 9 is a graph illustrating data for an average time to read a multi block IO from the data storage in accordance with an embodiment of the present invention.

To further illustrate the aspects of this invention, FIGS. 8-9 illustrate single block read time and multi block read time for a selected period of time with parameters chosen using a Decision Tree algorithm with the same arguments as the CPU utilization prediction that is presented in FIGS. 2-4 and described above. For example, FIG. 8 is a graph illustrating data for an average time to read a single block IO from the data storage in accordance with an embodiment of the present invention. Typically, the read time is 2 ms to up to 200 ms depending on the storage quality and workload. The example of FIG. 8 utilizes fictional server statistics from 10 ms to 100 ms. The model follows the process outlined above with respect to FIGS. 2-4 having the following arguments and rules:

Model Name: CLAS_DT_2_1
Node: 8
If HOUR<=4.5
Then 100
Node: 9
If 4.5<HOUR<=5.5
Then 40
Node: 10
If 5.5<HOUR<=6.5
Then 20
Node: 11
If 6.5<HOUR<=7.5
Then 15
Node: 12
If 7.5<HOUR<=17.5
And DAY_OF_THE_WEEK<=1.5
Then 100
Node: 13
If 7.5<HOUR<=17.5
And DAY_OF_THE_WEEK>1.5
Then 10
Node: 14
If 17.5<HOUR<=19.5
Then 20
Node: 15
If 19.5<HOUR<=20.5
Then 40
Node: 16
If HOUR>20.5
Then 100

The resulting data may be illustrated as follows:

Single Block Read Time Data

| ID | DATE | SREAD_TIME_ ACTUAL | SREAD_TIME_ PREDICTION | CLAS_DT_ 2_1_PROB | CLAS_DT_ 2_1_PCST |
|---|---|---|---|---|---|
| 1 | 5/1/10 12:00AM | 100 | 100 | 1 | 0 |
| 2 | 5/1/10 1:00 AM | 100 | 100 | 1 | 0 |
| 3 | 5/1/10 2:00 AM | 100 | 100 | 1 | 0 |
| 4 | 5/1/10 3:00 AM | 100 | 100 | 1 | 0 |
| 5 | 5/1/10 4:00 AM | 100 | 100 | 1 | 0 |
| 6 | 5/1/10 5:00 AM | 100 | 40 | 0.6 | 0.725423729 |
| 7 | 5/1/10 6:00 AM | 100 | 20 | 0.75 | 0.453389831 |
| 8 | 5/1/10 7:00 AM | 100 | 15 | 0.727272727 | 0.494607088 |
| 9 | 5/1/10 8:00 AM | 100 | 10 | 0.772727273 | 0.412172573 |
| 10 | 5/1/10 9:00 AM | 100 | 10 | 0.772727273 | 0.412172573 |
| 11 | 5/1/10 10:00AM | 100 | 10 | 0.772727273 | 0.412172573 |
| 12 | 5/1/10 11:00AM | 100 | 10 | 0.772727273 | 0.412172573 |
| 13 | 5/1/10 12:00 PM | 100 | 10 | 0.772727273 | 0.412172573 |
| 14 | 5/1/10 1:00 PM | 100 | 10 | 0.772727273 | 0.412172573 |
| 15 | 5/1/10 2:00 PM | 100 | 10 | 0.772727273 | 0.412172573 |
| 16 | 5/1/10 3:00 PM | 100 | 10 | 0.772727273 | 0.412172573 |
| 17 | 5/1/10 4:00 PM | 100 | 10 | 0.772727273 | 0.412172573 |
| 18 | 5/1/10 5:00 PM | 100 | 10 | 0.772727273 | 0.412172573 |
| 19 | 5/1/10 6:00 PM | 100 | 20 | 0.444444444 | 3.947697312 |
| 20 | 5/1/10 7:00 PM | 100 | 20 | 0.444444444 | 3.947697312 |
| 21 | 5/1/10 8:00 PM | 100 | 40 | 0.727272727 | 0.494607088 |
| 22 | 5/1/10 9:00 PM | 100 | 100 | 1 | 0 |
| 23 | 5/1/10 10:00 PM | 100 | 100 | 1 | 0 |
| 24 | 5/1/10 11:00 PM | 100 | 100 | 1 | 0 |
| 25 | 5/2/10 12:00AM | 100 | 100 | 1 | 0 |
| 26 | 5/2/10 1:00 AM | 100 | 100 | 1 | 0 |
| 27 | 5/2/10 2:00 AM | 100 | 100 | 1 | 0 |
| 28 | 5/2/10 3:00 AM | 100 | 100 | 1 | 0 |
| 29 | 5/2/10 4:00 AM | 100 | 100 | 1 | 0 |
| 30 | 5/2/10 5:00 AM | 100 | 40 | 0.6 | 0.725423729 |
| 31 | 5/2/10 6:00 AM | 100 | 20 | 0.75 | 0.453389831 |
| 32 | 5/2/10 7:00 AM | 100 | 15 | 0.727272727 | 0.494607088 |
| 33 | 5/2/10 8:00 AM | 100 | 100 | 1 | 0 |
| 34 | 5/2/10 9:00 AM | 100 | 100 | 1 | 0 |
| 35 | 5/2/10 10:00AM | 100 | 100 | 1 | 0 |
| 36 | 5/2/10 11:00AM | 100 | 100 | 1 | 0 |
| 37 | 5/2/10 12:00 PM | 100 | 100 | 1 | 0 |
| 38 | 5/2/10 1:00 PM | 100 | 100 | 1 | 0 |
| 39 | 5/2/10 2:00 PM | 100 | 100 | 1 | 0 |
| 40 | 5/2/10 3:00 PM | 100 | 100 | 1 | 0 |
| 41 | 5/2/10 4:00 PM | 100 | 100 | 1 | 0 |
| 42 | 5/2/10 5:00 PM | 100 | 100 | 1 | 0 |
| 43 | 5/2/10 6:00 PM | 100 | 20 | 0.444444444 | 3.947697312 |
| 44 | 5/2/10 7:00 PM | 100 | 20 | 0.444444444 | 3.947697312 |
| 45 | 5/2/10 8:00 PM | 100 | 40 | 0.727272727 | 0.494607088 |
| 46 | 5/2/10 9:00 PM | 100 | 100 | 1 | 0 |
| 47 | 5/2/10 10:00 PM | 100 | 100 | 1 | 0 |
| 48 | 5/2/10 11:00 PM | 100 | 100 | 1 | 0 |
| 49 | 5/3/10 12:00AM | 100 | 100 | 1 | 0 |
| 50 | 5/3/10 1:00 AM | 100 | 100 | 1 | 0 |
| 51 | 5/3/10 2:00 AM | 100 | 100 | 1 | 0 |
| 52 | 5/3/10 3:00 AM | 100 | 100 | 1 | 0 |
| 53 | 5/3/10 4:00 AM | 100 | 100 | 1 | 0 |
| 54 | 5/3/10 5:00 AM | 40 | 40 | 0.6 | 0.725423729 |
| 55 | 5/3/10 6:00 AM | 20 | 20 | 0.75 | 0.453389831 |
| 56 | 5/3/10 7:00 AM | 15 | 15 | 0.727272727 | 0.494607088 |
| 57 | 5/3/10 8:00 AM | 10 | 10 | 0.772727273 | 0.412172573 |
| 58 | 5/3/10 9:00 AM | 10 | 10 | 0.772727273 | 0.412172573 |
| 59 | 5/3/10 10:00AM | 10 | 10 | 0.772727273 | 0.412172573 |
| 60 | 5/3/10 11:00AM | 10 | 10 | 0.772727273 | 0.412172573 |
| 61 | 5/3/10 12:00 PM | 10 | 10 | 0.772727273 | 0.412172573 |
| 62 | 5/3/10 1:00 PM | 10 | 10 | 0.772727273 | 0.412172573 |
| 63 | 5/3/10 2:00 PM | 10 | 10 | 0.772727273 | 0.412172573 |
| 64 | 5/3/10 3:00 PM | 10 | 10 | 0.772727273 | 0.412172573 |
| 65 | 5/3/10 4:00 PM | 10 | 10 | 0.772727273 | 0.412172573 |
| 66 | 5/3/10 5:00 PM | 10 | 10 | 0.772727273 | 0.412172573 |
| 67 | 5/3/10 6:00 PM | 15 | 20 | 0.444444444 | 3.947697312 |
| 68 | 5/3/10 7:00 PM | 20 | 20 | 0.444444444 | 3.947697312 |
| 69 | 5/3/10 8:00 PM | 40 | 40 | 0.727272727 | 0.494607088 |
| 70 | 5/3/10 9:00 PM | 100 | 100 | 1 | 0 |
| 71 | 5/3/10 10:00 PM | 100 | 100 | 1 | 0 |
| 72 | 5/3/10 11:00 PM | 100 | 100 | 1 | 0 |
| 73 | 5/4/10 12:00AM | 100 | 100 | 1 | 0 |
| 74 | 5/4/10 1:00 AM | 100 | 100 | 1 | 0 |

-continued

Single Block Read Time Data

| ID | DATE | SREAD_TIME_ACTUAL | SREAD_TIME_PREDICTION | CLAS_DT_2_1_PROB | CLAS_DT_2_1_PCST |
|---|---|---|---|---|---|
| 75 | 5/4/10 2:00 AM | 100 | 100 | 1 | 0 |
| 76 | 5/4/10 3:00 AM | 100 | 100 | 1 | 0 |
| 77 | 5/4/10 4:00 AM | 100 | 100 | 1 | 0 |
| 78 | 5/4/10 5:00 AM | 40 | 40 | 0.6 | 0.725423729 |
| 79 | 5/4/10 6:00 AM | 20 | 20 | 0.75 | 0.453389831 |
| 80 | 5/4/10 7:00 AM | 15 | 15 | 0.727272727 | 0.494607088 |
| 81 | 5/4/10 8:00 AM | 10 | 10 | 0.772727273 | 0.412172573 |
| 82 | 5/4/10 9:00 AM | 10 | 10 | 0.772727273 | 0.412172573 |
| 83 | 5/4/10 10:00AM | 10 | 10 | 0.772727273 | 0.412172573 |
| 84 | 5/4/10 11:00AM | 10 | 10 | 0.772727273 | 0.412172573 |
| 85 | 5/4/10 12:00 PM | 10 | 10 | 0.772727273 | 0.412172573 |
| 86 | 5/4/10 1:00 PM | 10 | 10 | 0.772727273 | 0.412172573 |
| 87 | 5/4/10 2:00 PM | 10 | 10 | 0.772727273 | 0.412172573 |
| 88 | 5/4/10 3:00 PM | 10 | 10 | 0.772727273 | 0.412172573 |
| 89 | 5/4/10 4:00 PM | 10 | 10 | 0.772727273 | 0.412172573 |
| 90 | 5/4/10 5:00 PM | 10 | 10 | 0.772727273 | 0.412172573 |
| 91 | 5/4/10 6:00 PM | 15 | 20 | 0.444444444 | 3.947697312 |
| 92 | 5/4/10 7:00 PM | 20 | 20 | 0.444444444 | 3.947697312 |
| 93 | 5/4/10 8:00 PM | 40 | 40 | 0.727272727 | 0.494607088 |
| 94 | 5/4/10 9:00 PM | 100 | 100 | 1 | 0 |
| 95 | 5/4/10 10:00 PM | 100 | 100 | 1 | 0 |
| 96 | 5/4/10 11:00 PM | 100 | 100 | 1 | 0 |
| 97 | 5/5/10 12:00AM | 100 | 100 | 1 | 0 |
| 98 | 5/5/10 1:00 AM | 100 | 100 | 1 | 0 |
| 99 | 5/5/10 2:00 AM | 100 | 100 | 1 | 0 |
| 100 | 5/5/10 3:00 AM | 100 | 100 | 1 | 0 |
| 101 | 5/5/10 4:00 AM | 100 | 100 | 1 | 0 |
| 102 | 5/5/10 5:00 AM | 40 | 40 | 0.6 | 0.725423729 |
| 103 | 5/5/10 6:00 AM | 20 | 20 | 0.75 | 0.453389831 |
| 104 | 5/5/10 7:00 AM | 15 | 15 | 0.727272727 | 0.494607088 |
| 105 | 5/5/10 8:00 AM | 10 | 10 | 0.772727273 | 0.412172573 |
| 106 | 5/5/10 9:00 AM | 10 | 10 | 0.772727273 | 0.412172573 |
| 107 | 5/5/10 10:00 AM | 10 | 10 | 0.772727273 | 0.412172573 |
| 108 | 5/5/10 11:00 AM | 10 | 10 | 0.772727273 | 0.412172573 |
| 109 | 5/5/10 12:00 PM | 10 | 10 | 0.772727273 | 0.412172573 |
| 110 | 5/5/10 1:00 PM | 10 | 10 | 0.772727273 | 0.412172573 |
| 111 | 5/5/10 2:00 PM | 10 | 10 | 0.772727273 | 0.412172573 |
| 112 | 5/5/10 3:00 PM | 10 | 10 | 0.772727273 | 0.412172573 |
| 113 | 5/5/10 4:00 PM | 10 | 10 | 0.772727273 | 0.412172573 |
| 114 | 5/5/10 5:00 PM | 10 | 10 | 0.772727273 | 0.412172573 |
| 115 | 5/5/10 6:00 PM | 15 | 20 | 0.444444444 | 3.947697312 |
| 116 | 5/5/10 7:00 PM | 20 | 20 | 0.444444444 | 3.947697312 |
| 117 | 5/5/10 8:00 PM | 40 | 40 | 0.727272727 | 0.494607088 |
| 118 | 5/5/10 9:00 PM | 100 | 100 | 1 | 0 |
| 119 | 5/5/10 10:00 PM | 100 | 100 | 1 | 0 |
| 120 | 5/5/10 11:00 PM | 100 | 100 | 1 | 0 |
| 121 | 5/6/10 12:00 AM | 100 | 100 | 1 | 0 |
| 122 | 5/6/10 1:00 AM | 100 | 100 | 1 | 0 |
| 123 | 5/6/10 2:00 AM | 100 | 100 | 1 | 0 |
| 124 | 5/6/10 3:00 AM | 100 | 100 | 1 | 0 |
| 125 | 5/6/10 4:00 AM | 100 | 100 | 1 | 0 |
| 126 | 5/6/10 5:00 AM | 40 | 40 | 0.6 | 0.725423729 |
| 127 | 5/6/10 6:00 AM | 20 | 20 | 0.75 | 0.453389831 |
| 128 | 5/6/10 7:00 AM | 15 | 15 | 0.727272727 | 0.494607088 |
| 129 | 5/6/10 8:00 AM | 10 | 10 | 0.772727273 | 0.412172573 |
| 130 | 5/6/10 9:00 AM | 10 | 10 | 0.772727273 | 0.412172573 |
| 131 | 5/6/10 10:00 AM | 10 | 10 | 0.772727273 | 0.412172573 |
| 132 | 5/6/10 11:00 AM | 10 | 10 | 0.772727273 | 0.412172573 |
| 133 | 5/6/10 12:00 PM | 10 | 10 | 0.772727273 | 0.412172573 |
| 134 | 5/6/10 1:00 PM | 10 | 10 | 0.772727273 | 0.412172573 |
| 135 | 5/6/10 2:00 PM | 10 | 10 | 0.772727273 | 0.412172573 |
| 136 | 5/6/10 3:00 PM | 10 | 10 | 0.772727273 | 0.412172573 |
| 137 | 5/6/10 4:00 PM | 10 | 10 | 0.772727273 | 0.412172573 |
| 138 | 5/6/10 5:00 PM | 10 | 10 | 0.772727273 | 0.412172573 |
| 139 | 5/6/10 6:00 PM | 15 | 20 | 0.444444444 | 3.947697312 |
| 140 | 5/6/10 7:00 PM | 20 | 20 | 0.444444444 | 3.947697312 |
| 141 | 5/6/10 8:00 PM | 40 | 40 | 0.727272727 | 0.494607088 |
| 142 | 5/6/10 9:00 PM | 100 | 100 | 1 | 0 |
| 143 | 5/6/10 10:00 PM | 100 | 100 | 1 | 0 |
| 144 | 5/6/10 11:00 PM | 100 | 100 | 1 | 0 |
| 145 | 5/7/10 12:00 AM | 100 | 100 | 1 | 0 |
| 146 | 5/7/10 1:00 AM | 100 | 100 | 1 | 0 |
| 147 | 5/7/10 2:00 AM | 100 | 100 | 1 | 0 |
| 148 | 5/7/10 3:00 AM | 100 | 100 | 1 | 0 |

Single Block Read Time Data

| ID | DATE | SREAD_TIME_ ACTUAL | SREAD_TIME_ PREDICTION | CLAS_DT_ 2_1_PROB | CLAS_DT_ 2_1_PCST |
|---|---|---|---|---|---|
| 149 | 5/7/10 4:00 AM | 100 | 100 | 1 | 0 |
| 150 | 5/7/10 5:00 AM | 40 | 40 | 0.6 | 0.725423729 |
| 151 | 5/7/10 6:00 AM | 20 | 20 | 0.75 | 0.453389831 |
| 152 | 5/7/10 7:00 AM | 15 | 15 | 0.727272727 | 0.494607088 |
| 153 | 5/7/10 8:00 AM | 10 | 10 | 0.772727273 | 0.412172573 |
| 154 | 5/7/10 9:00 AM | 10 | 10 | 0.772727273 | 0.412172573 |
| 155 | 5/7/10 10:00 AM | 10 | 10 | 0.772727273 | 0.412172573 |
| 156 | 5/7/10 11:00 AM | 10 | 10 | 0.772727273 | 0.412172573 |
| 157 | 5/7/10 12:00 PM | 10 | 10 | 0.772727273 | 0.412172573 |
| 158 | 5/7/10 1:00 PM | 10 | 10 | 0.772727273 | 0.412172573 |
| 159 | 5/7/10 2:00 PM | 10 | 10 | 0.772727273 | 0.412172573 |
| 160 | 5/7/10 3:00 PM | 10 | 10 | 0.772727273 | 0.412172573 |
| 161 | 5/7/10 4:00 PM | 10 | 10 | 0.772727273 | 0.412172573 |
| 162 | 5/7/10 5:00 PM | 10 | 10 | 0.772727273 | 0.412172573 |
| 163 | 5/7/10 6:00 PM | 10 | 20 | 0.444444444 | 3.947697312 |
| 164 | 5/7/10 7:00 PM | 20 | 20 | 0.444444444 | 3.947697312 |
| 165 | 5/7/10 8:00 PM | 40 | 40 | 0.727272727 | 0.494607088 |
| 166 | 5/7/10 9:00 PM | 100 | 100 | 1 | 0 |
| 167 | 5/7/10 10:00 PM | 100 | 100 | 1 | 0 |
| 168 | 5/7/10 11:00 PM | 100 | 100 | 1 | 0 |
| 169 | 5/8/10 12:00 AM | 100 | 100 | 1 | 0 |
| 170 | 5/8/10 1:00 AM | 100 | 100 | 1 | 0 |
| 171 | 5/8/10 2:00 AM | 100 | 100 | 1 | 0 |
| 172 | 5/8/10 3:00 AM | 100 | 100 | 1 | 0 |
| 173 | 5/8/10 4:00 AM | 100 | 100 | 1 | 0 |
| 174 | 5/8/10 5:00 AM | 100 | 40 | 0.6 | 0.725423729 |
| 175 | 5/8/10 6:00 AM | 100 | 20 | 0.75 | 0.453389831 |
| 176 | 5/8/10 7:00 AM | 100 | 15 | 0.727272727 | 0.494607088 |
| 177 | 5/8/10 8:00 AM | 100 | 10 | 0.772727273 | 0.412172573 |
| 178 | 5/8/10 9:00 AM | 100 | 10 | 0.772727273 | 0.412172573 |
| 179 | 5/8/10 10:00 AM | 100 | 10 | 0.772727273 | 0.412172573 |
| 180 | 5/8/10 11:00 AM | 100 | 10 | 0.772727273 | 0.412172573 |
| 181 | 5/8/10 12:00 PM | 100 | 10 | 0.772727273 | 0.412172573 |
| 182 | 5/8/10 1:00 PM | 100 | 10 | 0.772727273 | 0.412172573 |
| 183 | 5/8/10 2:00 PM | 100 | 10 | 0.772727273 | 0.412172573 |
| 184 | 5/8/10 3:00 PM | 100 | 10 | 0.772727273 | 0.412172573 |
| 185 | 5/8/10 4:00 PM | 100 | 10 | 0.772727273 | 0.412172573 |
| 186 | 5/8/10 5:00 PM | 100 | 10 | 0.772727273 | 0.412172573 |
| 187 | 5/8/10 6:00 PM | 100 | 20 | 0.444444444 | 3.947697312 |
| 188 | 5/8/10 7:00 PM | 100 | 20 | 0.444444444 | 3.947697312 |
| 189 | 5/8/10 8:00 PM | 100 | 40 | 0.727272727 | 0.494607088 |
| 190 | 5/8/10 9:00 PM | 100 | 100 | 1 | 0 |
| 191 | 5/8/10 10:00 PM | 100 | 100 | 1 | 0 |
| 192 | 5/8/10 11:00 PM | 100 | 100 | 1 | 0 |
| 193 | 5/9/10 12:00 AM | 100 | 100 | 1 | 0 |
| 194 | 5/9/10 1:00 AM | 100 | 100 | 1 | 0 |
| 195 | 5/9/10 2:00 AM | 100 | 100 | 1 | 0 |
| 196 | 5/9/10 3:00 AM | 100 | 100 | 1 | 0 |
| 197 | 5/9/10 4:00 AM | 100 | 100 | 1 | 0 |
| 198 | 5/9/10 5:00 AM | 100 | 40 | 0.6 | 0.725423729 |
| 199 | 5/9/10 6:00 AM | 100 | 20 | 0.75 | 0.453389831 |
| 200 | 5/9/10 7:00 AM | 100 | 15 | 0.727272727 | 0.494607088 |
| 201 | 5/9/10 8:00 AM | 100 | 100 | 1 | 0 |
| 202 | 5/9/10 9:00 AM | 100 | 100 | 1 | 0 |
| 203 | 5/9/10 10:00 AM | 100 | 100 | 1 | 0 |
| 204 | 5/9/10 11:00 AM | 100 | 100 | 1 | 0 |
| 205 | 5/9/10 12:00 PM | 100 | 100 | 1 | 0 |
| 206 | 5/9/10 1:00 PM | 100 | 100 | 1 | 0 |
| 207 | 5/9/10 2:00 PM | 100 | 100 | 1 | 0 |
| 208 | 5/9/10 3:00 PM | 100 | 100 | 1 | 0 |
| 209 | 5/9/10 4:00 PM | 100 | 100 | 1 | 0 |
| 210 | 5/9/10 5:00 PM | 100 | 100 | 1 | 0 |
| 211 | 5/9/10 6:00 PM | 100 | 20 | 0.444444444 | 3.947697312 |
| 212 | 5/9/10 7:00 PM | 100 | 20 | 0.444444444 | 3.947697312 |
| 213 | 5/9/10 8:00 PM | 100 | 40 | 0.727272727 | 0.494607088 |
| 214 | 5/9/10 9:00 PM | 100 | 100 | 1 | 0 |
| 215 | 5/9/10 10:00 PM | 100 | 100 | 1 | 0 |
| 216 | 5/9/10 11:00 PM | 100 | 100 | 1 | 0 |
| 217 | 5/10/10 12: AM | 100 | 100 | 1 | 0 |
| 218 | 5/10/10 1:00 AM | 100 | 100 | 1 | 0 |
| 219 | 5/10/10 2:00 AM | 100 | 100 | 1 | 0 |
| 220 | 5/10/10 3:00 AM | 100 | 100 | 1 | 0 |
| 221 | 5/10/10 4:00 AM | 100 | 100 | 1 | 0 |
| 222 | 5/10/10 5:00 AM | 40 | 40 | 0.6 | 0.725423729 |

-continued

| | | Single Block Read Time Data | | | |
|---|---|---|---|---|---|
| ID | DATE | SREAD_TIME_ ACTUAL | SREAD_TIME_ PREDICTION | CLAS_DT_ 2_1_PROB | CLAS_DT_ 2_1_PCST |
| 223 | 5/10/10 6:00 AM | 20 | 20 | 0.75 | 0.453389831 |
| 224 | 5/10/10 7:00 AM | 15 | 15 | 0.727272727 | 0.494607088 |
| 225 | 5/10/10 8:00 AM | 10 | 10 | 0.772727273 | 0.412172573 |
| 226 | 5/10/10 9:00 AM | 10 | 10 | 0.772727273 | 0.412172573 |
| 227 | 5/10/10 10: AM | 10 | 10 | 0.772727273 | 0.412172573 |
| 228 | 5/10/10 11: AM | 10 | 10 | 0.772727273 | 0.412172573 |
| 229 | 5/10/10 12: PM | 10 | 10 | 0.772727273 | 0.412172573 |
| 230 | 5/10/10 1:00 PM | 10 | 10 | 0.772727273 | 0.412172573 |
| 231 | 5/10/10 2:00 PM | 10 | 10 | 0.772727273 | 0.412172573 |
| 232 | 5/10/10 3:00 PM | 10 | 10 | 0.772727273 | 0.412172573 |
| 233 | 5/10/10 4:00 PM | 10 | 10 | 0.772727273 | 0.412172573 |
| 234 | 5/10/10 5:00 PM | 10 | 10 | 0.772727273 | 0.412172573 |
| 235 | 5/10/10 6:00 PM | 15 | 20 | 0.444444444 | 3.947697312 |
| 236 | 5/10/10 7:00 PM | 20 | 20 | 0.444444444 | 3.947697312 |
| 237 | 5/10/10 8:00 PM | 40 | 40 | 0.727272727 | 0.494607088 |
| 238 | 5/10/10 9:00 PM | 100 | 100 | 1 | 0 |
| 239 | 5/10/10 10: PM | 100 | 100 | 1 | 0 |
| 240 | 5/10/10 11: PM | 100 | 100 | 1 | 0 |
| 241 | 5/11/10 12: AM | 100 | 100 | 1 | 0 |
| 242 | 5/11/10 1:00 AM | 100 | 100 | 1 | 0 |
| 243 | 5/11/10 2:00 AM | 100 | 100 | 1 | 0 |
| 244 | 5/11/10 3:00 AM | 100 | 100 | 1 | 0 |
| 245 | 5/11/10 4:00 AM | 100 | 100 | 1 | 0 |
| 246 | 5/11/10 5:00 AM | 40 | 40 | 0.6 | 0.725423729 |
| 247 | 5/11/10 6:00 AM | 20 | 20 | 0.75 | 0.453389831 |
| 248 | 5/11/10 7:00 AM | 15 | 15 | 0.727272727 | 0.494607088 |
| 249 | 5/11/10 8:00 AM | 10 | 10 | 0.772727273 | 0.412172573 |
| 250 | 5/11/10 9:00 AM | 10 | 10 | 0.772727273 | 0.412172573 |
| 251 | 5/11/10 10: AM | 10 | 10 | 0.772727273 | 0.412172573 |
| 252 | 5/11/10 11: AM | 10 | 10 | 0.772727273 | 0.412172573 |
| 253 | 5/11/10 12: PM | 10 | 10 | 0.772727273 | 0.412172573 |
| 254 | 5/11/10 1:00 PM | 10 | 10 | 0.772727273 | 0.412172573 |
| 255 | 5/11/10 2:00 PM | 10 | 10 | 0.772727273 | 0.412172573 |
| 256 | 5/11/10 3:00 PM | 10 | 10 | 0.772727273 | 0.412172573 |
| 257 | 5/11/10 4:00 PM | 10 | 10 | 0.772727273 | 0.412172573 |
| 258 | 5/11/10 5:00 PM | 10 | 10 | 0.772727273 | 0.412172573 |
| 259 | 5/11/10 6:00 PM | 15 | 20 | 0.444444444 | 3.947697312 |
| 260 | 5/11/10 7:00 PM | 20 | 20 | 0.444444444 | 3.947697312 |
| 261 | 5/11/10 8:00 PM | 40 | 40 | 0.727272727 | 0.494607088 |
| 262 | 5/11/10 9:00 PM | 100 | 100 | 1 | 0 |
| 263 | 5/11/10 10: PM | 100 | 100 | 1 | 0 |
| 264 | 5/11/10 11: PM | 100 | 100 | 1 | 0 |
| 265 | 5/12/10 12: AM | 100 | 100 | 1 | 0 |
| 266 | 5/12/10 1:00 AM | 100 | 100 | 1 | 0 |
| 267 | 5/12/10 2:00 AM | 100 | 100 | 1 | 0 |
| 268 | 5/12/10 3:00 AM | 100 | 100 | 1 | 0 |
| 269 | 5/12/10 4:00 AM | 100 | 100 | 1 | 0 |
| 270 | 5/12/10 5:00 AM | 40 | 40 | 0.6 | 0.725423729 |
| 271 | 5/12/10 6:00 AM | 20 | 20 | 0.75 | 0.453389831 |
| 272 | 5/12/10 7:00 AM | 15 | 15 | 0.727272727 | 0.494607088 |
| 273 | 5/12/10 8:00 AM | 10 | 10 | 0.772727273 | 0.412172573 |
| 274 | 5/12/10 9:00 AM | 10 | 10 | 0.772727273 | 0.412172573 |
| 275 | 5/12/10 10: AM | 10 | 10 | 0.772727273 | 0.412172573 |
| 276 | 5/12/10 11: AM | 10 | 10 | 0.772727273 | 0.412172573 |
| 277 | 5/12/10 12: PM | 10 | 10 | 0.772727273 | 0.412172573 |
| 278 | 5/12/10 1:00 PM | 10 | 10 | 0.772727273 | 0.412172573 |
| 279 | 5/12/10 2:00 PM | 10 | 10 | 0.772727273 | 0.412172573 |
| 280 | 5/12/10 3:00 PM | 10 | 10 | 0.772727273 | 0.412172573 |
| 281 | 5/12/10 4:00 PM | 10 | 10 | 0.772727273 | 0.412172573 |
| 282 | 5/12/10 5:00 PM | 10 | 10 | 0.772727273 | 0.412172573 |
| 283 | 5/12/10 6:00 PM | 15 | 20 | 0.444444444 | 3.947697312 |
| 284 | 5/12/10 7:00 PM | 20 | 20 | 0.444444444 | 3.947697312 |
| 285 | 5/12/10 8:00 PM | 40 | 40 | 0.727272727 | 0.494607088 |
| 286 | 5/12/10 9:00 PM | 100 | 100 | 1 | 0 |
| 287 | 5/12/10 10: PM | 100 | 100 | 1 | 0 |
| 288 | 5/12/10 11: PM | 100 | 100 | 1 | 0 |
| 289 | 5/13/10 12: AM | 100 | 100 | 1 | 0 |
| 290 | 5/13/10 1:00 AM | 100 | 100 | 1 | 0 |
| 291 | 5/13/10 2:00 AM | 100 | 100 | 1 | 0 |
| 292 | 5/13/10 3:00 AM | 100 | 100 | 1 | 0 |
| 293 | 5/13/10 4:00 AM | 100 | 100 | 1 | 0 |
| 294 | 5/13/10 5:00 AM | 40 | 40 | 0.6 | 0.725423729 |
| 295 | 5/13/10 6:00 AM | 20 | 20 | 0.75 | 0.453389831 |
| 296 | 5/13/10 7:00 AM | 15 | 15 | 0.727272727 | 0.494607088 |

-continued

| | | Single Block Read Time Data | | | |
|---|---|---|---|---|---|
| ID | DATE | SREAD_TIME_ ACTUAL | SREAD_TIME_ PREDICTION | CLAS_DT_ 2_1_PROB | CLAS_DT_ 2_1_PCST |
| 297 | 5/13/10 8:00 AM | 10 | 10 | 0.772727273 | 0.412172573 |
| 298 | 5/13/10 9:00 AM | 10 | 10 | 0.772727273 | 0.412172573 |
| 299 | 5/13/10 10: AM | 10 | 10 | 0.772727273 | 0.412172573 |
| 300 | 5/13/10 11: AM | 10 | 10 | 0.772727273 | 0.412172573 |
| 301 | 5/13/10 12: PM | 10 | 10 | 0.772727273 | 0.412172573 |
| 302 | 5/13/10 1:00 PM | 10 | 10 | 0.772727273 | 0.412172573 |
| 303 | 5/13/10 2:00 PM | 10 | 10 | 0.772727273 | 0.412172573 |
| 304 | 5/13/10 3:00 PM | 10 | 10 | 0.772727273 | 0.412172573 |
| 305 | 5/13/10 4:00 PM | 10 | 10 | 0.772727273 | 0.412172573 |
| 306 | 5/13/10 5:00 PM | 10 | 10 | 0.772727273 | 0.412172573 |
| 307 | 5/13/10 6:00 PM | 15 | 20 | 0.444444444 | 3.947697312 |
| 308 | 5/13/10 7:00 PM | 20 | 20 | 0.444444444 | 3.947697312 |
| 309 | 5/13/10 8:00 PM | 40 | 40 | 0.727272727 | 0.494607088 |
| 310 | 5/13/10 9:00 PM | 100 | 100 | 1 | 0 |
| 311 | 5/13/10 10: PM | 100 | 100 | 1 | 0 |
| 312 | 5/13/10 11: PM | 100 | 100 | 1 | 0 |
| 313 | 5/14/10 12: AM | 100 | 100 | 1 | 0 |
| 314 | 5/14/10 1:00 AM | 100 | 100 | 1 | 0 |
| 315 | 5/14/10 2:00 AM | 100 | 100 | 1 | 0 |
| 316 | 5/14/10 3:00 AM | 100 | 100 | 1 | 0 |
| 317 | 5/14/10 4:00 AM | 100 | 100 | 1 | 0 |
| 318 | 5/14/10 5:00 AM | 40 | 40 | 0.6 | 0.725423729 |
| 319 | 5/14/10 6:00 AM | 20 | 20 | 0.75 | 0.453389831 |
| 320 | 5/14/10 7:00 AM | 15 | 15 | 0.727272727 | 0.494607088 |
| 321 | 5/14/10 8:00 AM | 10 | 10 | 0.772727273 | 0.412172573 |
| 322 | 5/14/10 9:00 AM | 10 | 10 | 0.772727273 | 0.412172573 |
| 323 | 5/14/10 10: AM | 10 | 10 | 0.772727273 | 0.412172573 |
| 324 | 5/14/10 11: AM | 10 | 10 | 0.772727273 | 0.412172573 |
| 325 | 5/14/10 12: PM | 10 | 10 | 0.772727273 | 0.412172573 |
| 326 | 5/14/10 1:00 PM | 10 | 10 | 0.772727273 | 0.412172573 |
| 327 | 5/14/10 2:00 PM | 10 | 10 | 0.772727273 | 0.412172573 |
| 328 | 5/14/10 3:00 PM | 10 | 10 | 0.772727273 | 0.412172573 |
| 329 | 5/14/10 4:00 PM | 10 | 10 | 0.772727273 | 0.412172573 |
| 330 | 5/14/10 5:00 PM | 10 | 10 | 0.772727273 | 0.412172573 |
| 331 | 5/14/10 6:00 PM | 15 | 20 | 0.444444444 | 3.947697312 |
| 332 | 5/14/10 7:00 PM | 20 | 20 | 0.444444444 | 3.947697312 |
| 333 | 5/14/10 8:00 PM | 40 | 40 | 0.727272727 | 0.494607088 |
| 334 | 5/14/10 9:00 PM | 100 | 100 | 1 | 0 |
| 335 | 5/14/10 10: PM | 100 | 100 | 1 | 0 |
| 336 | 5/14/10 11: PM | 100 | 100 | 1 | 0 |
| 337 | 5/15/10 12: AM | 100 | 100 | 1 | 0 |
| 338 | 5/15/10 1:00 AM | 100 | 100 | 1 | 0 |
| 339 | 5/15/10 2:00 AM | 100 | 100 | 1 | 0 |
| 340 | 5/15/10 3:00 AM | 100 | 100 | 1 | 0 |
| 341 | 5/15/10 4:00 AM | 100 | 100 | 1 | 0 |
| 342 | 5/15/10 5:00 AM | 100 | 40 | 0.6 | 0.725423729 |
| 343 | 5/15/10 6:00 AM | 100 | 20 | 0.75 | 0.453389831 |
| 344 | 5/15/10 7:00 AM | 100 | 15 | 0.727272727 | 0.494607088 |
| 345 | 5/15/10 8:00 AM | 100 | 10 | 0.772727273 | 0.412172573 |
| 346 | 5/15/10 9:00 AM | 100 | 10 | 0.772727273 | 0.412172573 |
| 347 | 5/15/10 10: AM | 100 | 10 | 0.772727273 | 0.412172573 |
| 348 | 5/15/10 11: AM | 100 | 10 | 0.772727273 | 0.412172573 |
| 349 | 5/15/10 12: PM | 100 | 10 | 0.772727273 | 0.412172573 |
| 350 | 5/15/10 1:00 PM | 100 | 10 | 0.772727273 | 0.412172573 |
| 351 | 5/15/10 2:00 PM | 100 | 10 | 0.772727273 | 0.412172573 |
| 352 | 5/15/10 3:00 PM | 100 | 10 | 0.772727273 | 0.412172573 |
| 353 | 5/15/10 4:00 PM | 100 | 10 | 0.772727273 | 0.412172573 |
| 354 | 5/15/10 5:00 PM | 100 | 10 | 0.772727273 | 0.412172573 |
| 355 | 5/15/10 6:00 PM | 100 | 20 | 0.444444444 | 3.947697312 |
| 356 | 5/15/10 7:00 PM | 100 | 20 | 0.444444444 | 3.947697312 |
| 357 | 5/15/10 8:00 PM | 100 | 40 | 0.727272727 | 0.494607088 |
| 358 | 5/15/10 9:00 PM | 100 | 100 | 1 | 0 |
| 359 | 5/15/10 10: PM | 100 | 100 | 1 | 0 |
| 360 | 5/15/10 11: PM | 100 | 100 | 1 | 0 |
| 361 | 5/16/10 12: AM | 100 | 100 | 1 | 0 |
| 362 | 5/16/10 1:00 AM | 100 | 100 | 1 | 0 |
| 363 | 5/16/10 2:00 AM | 100 | 100 | 1 | 0 |
| 364 | 5/16/10 3:00 AM | 100 | 100 | 1 | 0 |
| 365 | 5/16/10 4:00 AM | 100 | 100 | 1 | 0 |
| 366 | 5/16/10 5:00 AM | 100 | 40 | 0.6 | 0.725423729 |
| 367 | 5/16/10 6:00 AM | 100 | 20 | 0.75 | 0.453389831 |
| 368 | 5/16/10 7:00 AM | 100 | 15 | 0.727272727 | 0.494607088 |
| 369 | 5/16/10 8:00 AM | 100 | 100 | 1 | 0 |
| 370 | 5/16/10 9:00 AM | 100 | 100 | 1 | 0 |

-continued

| | | Single Block Read Time Data | | | |
|---|---|---|---|---|---|
| ID | DATE | SREAD_TIME_ ACTUAL | SREAD_TIME_ PREDICTION | CLAS_DT_ 2_1_PROB | CLAS_DT_ 2_1_PCST |
| 371 | 5/16/10 10: AM | 100 | 100 | 1 | 0 |
| 372 | 5/16/10 11: AM | 100 | 100 | 1 | 0 |
| 373 | 5/16/10 12: PM | 100 | 100 | 1 | 0 |
| 374 | 5/16/10 1:00 PM | 100 | 100 | 1 | 0 |
| 375 | 5/16/10 2:00 PM | 100 | 100 | 1 | 0 |
| 376 | 5/16/10 3:00 PM | 100 | 100 | 1 | 0 |
| 377 | 5/16/10 4:00 PM | 100 | 100 | 1 | 0 |
| 378 | 5/16/10 5:00 PM | 100 | 100 | 1 | 0 |
| 379 | 5/16/10 6:00 PM | 100 | 20 | 0.444444444 | 3.947697312 |
| 380 | 5/16/10 7:00 PM | 100 | 20 | 0.444444444 | 3.947697312 |
| 381 | 5/16/10 8:00 PM | 100 | 40 | 0.727272727 | 0.494607088 |
| 382 | 5/16/10 9:00 PM | 100 | 100 | 1 | 0 |
| 383 | 5/16/10 10: PM | 100 | 100 | 1 | 0 |
| 384 | 5/16/10 11: PM | 100 | 100 | 1 | 0 |
| 385 | 5/17/10 12: AM | 100 | 100 | 1 | 0 |
| 386 | 5/17/10 1:00 AM | 100 | 100 | 1 | 0 |
| 387 | 5/17/10 2:00 AM | 100 | 100 | 1 | 0 |
| 388 | 5/17/10 3:00 AM | 100 | 100 | 1 | 0 |
| 389 | 5/17/10 4:00 AM | 100 | 100 | 1 | 0 |
| 390 | 5/17/10 5:00 AM | 40 | 40 | 0.6 | 0.725423729 |
| 391 | 5/17/10 6:00 AM | 20 | 20 | 0.75 | 0.453389831 |
| 392 | 5/17/10 7:00 AM | 15 | 15 | 0.727272727 | 0.494607088 |
| 393 | 5/17/10 8:00 AM | 10 | 10 | 0.772727273 | 0.412172573 |
| 394 | 5/17/10 9:00 AM | 10 | 10 | 0.772727273 | 0.412172573 |
| 395 | 5/17/10 10: AM | 10 | 10 | 0.772727273 | 0.412172573 |
| 396 | 5/17/10 11: AM | 10 | 10 | 0.772727273 | 0.412172573 |
| 397 | 5/17/10 12: PM | 10 | 10 | 0.772727273 | 0.412172573 |
| 398 | 5/17/10 1:00 PM | 10 | 10 | 0.772727273 | 0.412172573 |
| 399 | 5/17/10 2:00 PM | 10 | 10 | 0.772727273 | 0.412172573 |
| 400 | 5/17/10 3:00 PM | 10 | 10 | 0.772727273 | 0.412172573 |
| 401 | 5/17/10 4:00 PM | 10 | 10 | 0.772727273 | 0.412172573 |
| 402 | 5/17/10 5:00 PM | 10 | 10 | 0.772727273 | 0.412172573 |
| 403 | 5/17/10 6:00 PM | 15 | 20 | 0.444444444 | 3.947697312 |
| 404 | 5/17/10 7:00 PM | 20 | 20 | 0.444444444 | 3.947697312 |
| 405 | 5/17/10 8:00 PM | 40 | 40 | 0.727272727 | 0.494607088 |
| 406 | 5/17/10 9:00 PM | 100 | 100 | 1 | 0 |
| 407 | 5/17/10 10: PM | 100 | 100 | 1 | 0 |
| 408 | 5/17/10 11: PM | 100 | 100 | 1 | 0 |
| 409 | 5/18/10 12: AM | 100 | 100 | 1 | 0 |
| 410 | 5/18/10 1:00 AM | 100 | 100 | 1 | 0 |
| 411 | 5/18/10 2:00 AM | 100 | 100 | 1 | 0 |
| 412 | 5/18/10 3:00 AM | 100 | 100 | 1 | 0 |
| 413 | 5/18/10 4:00 AM | | 100 | 1 | 0 |
| 414 | 5/18/10 5:00 AM | | 40 | 0.6 | 0.725423729 |
| 415 | 5/18/10 6:00 AM | | 20 | 0.75 | 0.453389831 |
| 416 | 5/18/10 7:00 AM | | 15 | 0.727272727 | 0.494607088 |
| 417 | 5/18/10 8:00 AM | | 10 | 0.772727273 | 0.412172573 |
| 418 | 5/18/10 9:00 AM | | 10 | 0.772727273 | 0.412172573 |
| 419 | 5/18/10 10: AM | | 10 | 0.772727273 | 0.412172573 |
| 420 | 5/18/10 11: AM | | 10 | 0.772727273 | 0.412172573 |
| 421 | 5/18/10 12: PM | | 10 | 0.772727273 | 0.412172573 |
| 422 | 5/18/10 1:00 PM | | 10 | 0.772727273 | 0.412172573 |
| 423 | 5/18/10 2:00 PM | | 10 | 0.772727273 | 0.412172573 |
| 424 | 5/18/10 3:00 PM | | 10 | 0.772727273 | 0.412172573 |
| 425 | 5/18/10 4:00 PM | | 10 | 0.772727273 | 0.412172573 |
| 426 | 5/18/10 5:00 PM | | 10 | 0.772727273 | 0.412172573 |
| 427 | 5/18/10 6:00 PM | | 20 | 0.444444444 | 3.947697312 |
| 428 | 5/18/10 7:00 PM | | 20 | 0.444444444 | 3.947697312 |
| 429 | 5/18/10 8:00 PM | | 40 | 0.727272727 | 0.494607088 |
| 430 | 5/18/10 9:00 PM | | 100 | 1 | 0 |
| 431 | 5/18/10 10: PM | | 100 | 1 | 0 |
| 432 | 5/18/10 11: PM | | 100 | 1 | 0 |
| 433 | 5/19/10 12: AM | | 100 | 1 | 0 |

Following the rules set forth above, one may, according to the present invention, forecast the single block read time of any given hour and day of the week for a given server. As a result, one may anticipate the optimal SQL execution plan to a scheduled command to be run on that given server.

By way of a similar example, FIG. 9 is a graph illustrating data for an average time to read a multi block IO from the data storage in accordance with an embodiment of the present invention. Typically, there are 2 and up to 32 blocks, and the read time is 10 ms and up to 400 ms depending on the storage quality and workload. The example of FIG. 9 utilizes fictional server statistics from 20 ms to 200 ms. The model follows the process outlined above with respect to FIGS. 2-4 having the following arguments and rules:

Model Name: CLAS_DT_1_3
Node: 8
If HOUR<=4.5
Then 180
Node: 9
If 4.5<HOUR<=5.5
Then 70
Node: 10
If 5.5<HOUR<=6.5
Then 40
Node: 11
If 6.5<HOUR<=7.5
Then 30
Node: 12
If 7.5<HOUR<=17.5
And DAY_OF_THE_WEEK<=1.5
Then 180
Node: 13
If 7.5<HOUR<=17.5
And DAY_OF_THE_WEEK>1.5
Then 20
Node: 14
If 17.5<HOUR<=19.5
Then 40
Node: 15
If 19.5<HOUR<=20.5
Then 70
Node: 16
If HOUR>20.5
Then 180

The resulting data may be illustrated as follows:

Multi Block Read Time Data

| ID | DATE | SREAD_TIME | SREAD_TIME_PREDICTION | CLAS_DT_1_3_PROB | CLAS_DT_1_3_PCST |
|---|---|---|---|---|---|
| 1 | 5/1/10 12:00 AM | 180 | 180 | 1 | 0 |
| 2 | 5/1/10 1:00 AM | 180 | 180 | 1 | 0 |
| 3 | 5/1/10 2:00 AM | 180 | 180 | 1 | 0 |
| 4 | 5/1/10 3:00 AM | 180 | 180 | 1 | 0 |
| 5 | 5/1/10 4:00 AM | 180 | 180 | 1 | 0 |
| 6 | 5/1/10 5:00 AM | 180 | 70 | 0.6 | 0.725424 |
| 7 | 5/1/10 6:00 AM | 180 | 40 | 0.75 | 0.45339 |
| 8 | 5/1/10 7:00 AM | 180 | 30 | 0.727273 | 0.494607 |
| 9 | 5/1/10 8:00 AM | 180 | 20 | 0.772727 | 0.412173 |
| 10 | 5/1/10 9:00 AM | 180 | 20 | 0.772727 | 0.412173 |
| 11 | 5/1/10 10:00 AM | 180 | 20 | 0.772727 | 0.412173 |
| 12 | 5/1/10 11:00 AM | 180 | 20 | 0.772727 | 0.412173 |
| 13 | 5/1/10 12:00 PM | 180 | 20 | 0.772727 | 0.412173 |
| 14 | 5/1/10 1:00 PM | 180 | 20 | 0.772727 | 0.412173 |
| 15 | 5/1/10 2:00 PM | 180 | 20 | 0.772727 | 0.412173 |
| 16 | 5/1/10 3:00 PM | 180 | 20 | 0.772727 | 0.412173 |
| 17 | 5/1/10 4:00 PM | 180 | 20 | 0.772727 | 0.412173 |
| 18 | 5/1/10 5:00 PM | 180 | 20 | 0.772727 | 0.412173 |
| 19 | 5/1/10 6:00 PM | 180 | 40 | 0.444444 | 3.947697 |
| 20 | 5/1/10 7:00 PM | 180 | 40 | 0.444444 | 3.947697 |
| 21 | 5/1/10 8:00 PM | 180 | 70 | 0.727273 | 0.494607 |
| 22 | 5/1/10 9:00 PM | 180 | 180 | 1 | 0 |
| 23 | 5/1/10 10:00 PM | 180 | 180 | 1 | 0 |
| 24 | 5/1/10 11:00 PM | 180 | 180 | 1 | 0 |
| 25 | 5/2/10 12:00 AM | 180 | 180 | 1 | 0 |
| 26 | 5/2/10 1:00 AM | 180 | 180 | 1 | 0 |
| 27 | 5/2/10 2:00 AM | 180 | 180 | 1 | 0 |
| 28 | 5/2/10 3:00 AM | 180 | 180 | 1 | 0 |
| 29 | 5/2/10 4:00 AM | 180 | 180 | 1 | 0 |
| 30 | 5/2/10 5:00 AM | 180 | 70 | 0.6 | 0.725424 |
| 31 | 5/2/10 6:00 AM | 180 | 40 | 0.75 | 0.45339 |
| 32 | 5/2/10 7:00 AM | 180 | 30 | 0.727273 | 0.494607 |
| 33 | 5/2/10 8:00 AM | 180 | 180 | 1 | 0 |
| 34 | 5/2/10 9:00 AM | 180 | 180 | 1 | 0 |
| 35 | 5/2/10 10:00 AM | 180 | 180 | 1 | 0 |
| 36 | 5/2/10 11:00 AM | 180 | 180 | 1 | 0 |
| 37 | 5/2/10 12:00 PM | 180 | 180 | 1 | 0 |
| 38 | 5/2/10 1:00 PM | 180 | 180 | 1 | 0 |
| 39 | 5/2/10 2:00 PM | 180 | 180 | 1 | 0 |
| 40 | 5/2/10 3:00 PM | 180 | 180 | 1 | 0 |
| 41 | 5/2/10 4:00 PM | 180 | 180 | 1 | 0 |
| 42 | 5/2/10 5:00 PM | 180 | 180 | 1 | 0 |
| 43 | 5/2/10 6:00 PM | 180 | 40 | 0.444444 | 3.947697 |
| 44 | 5/2/10 7:00 PM | 180 | 40 | 0.444444 | 3.947697 |
| 45 | 5/2/10 8:00 PM | 180 | 70 | 0.727273 | 0.494607 |
| 46 | 5/2/10 9:00 PM | 180 | 180 | 1 | 0 |
| 47 | 5/2/10 10:00 PM | 180 | 180 | 1 | 0 |
| 48 | 5/2/10 11:00 PM | 180 | 180 | 1 | 0 |
| 49 | 5/3/10 12:00 AM | 180 | 180 | 1 | 0 |
| 50 | 5/3/10 1:00 AM | 180 | 180 | 1 | 0 |
| 51 | 5/3/10 2:00 AM | 180 | 180 | 1 | 0 |
| 52 | 5/3/10 3:00 AM | 180 | 180 | 1 | 0 |
| 53 | 5/3/10 4:00 AM | 180 | 180 | 1 | 0 |
| 54 | 5/3/10 5:00 AM | 70 | 70 | 0.6 | 0.725424 |
| 55 | 5/3/10 6:00 AM | 40 | 40 | 0.75 | 0.45339 |
| 56 | 5/3/10 7:00 AM | 30 | 30 | 0.727273 | 0.494607 |
| 57 | 5/3/10 8:00 AM | 20 | 20 | 0.772727 | 0.412173 |
| 58 | 5/3/10 9:00 AM | 20 | 20 | 0.772727 | 0.412173 |
| 59 | 5/3/10 10:00 AM | 20 | 20 | 0.772727 | 0.412173 |
| 60 | 5/3/10 11:00 AM | 20 | 20 | 0.772727 | 0.412173 |
| 61 | 5/3/10 12:00 PM | 20 | 20 | 0.772727 | 0.412173 |
| 62 | 5/3/10 1:00 PM | 20 | 20 | 0.772727 | 0.412173 |
| 63 | 5/3/10 2:00 PM | 20 | 20 | 0.772727 | 0.412173 |
| 64 | 5/3/10 3:00 PM | 20 | 20 | 0.772727 | 0.412173 |
| 65 | 5/3/10 4:00 PM | 20 | 20 | 0.772727 | 0.412173 |
| 66 | 5/3/10 5:00 PM | 20 | 20 | 0.772727 | 0.412173 |
| 67 | 5/3/10 6:00 PM | 30 | 40 | 0.444444 | 3.947697 |
| 68 | 5/3/10 7:00 PM | 40 | 40 | 0.444444 | 3.947697 |
| 69 | 5/3/10 8:00 PM | 70 | 70 | 0.727273 | 0.494607 |
| 70 | 5/3/10 9:00 PM | 180 | 180 | 1 | 0 |
| 71 | 5/3/10 10:00 PM | 180 | 180 | 1 | 0 |
| 72 | 5/3/10 11:00 PM | 180 | 180 | 1 | 0 |
| 73 | 5/4/10 12:00 AM | 180 | 180 | 1 | 0 |
| 74 | 5/4/10 1:00 AM | 180 | 180 | 1 | 0 |
| 75 | 5/4/10 2:00 AM | 180 | 180 | 1 | 0 |
| 76 | 5/4/10 3:00 AM | 180 | 180 | 1 | 0 |
| 77 | 5/4/10 4:00 AM | 180 | 180 | 1 | 0 |
| 78 | 5/4/10 5:00 AM | 70 | 70 | 0.6 | 0.725424 |
| 79 | 5/4/10 6:00 AM | 40 | 40 | 0.75 | 0.45339 |
| 80 | 5/4/10 7:00 AM | 30 | 30 | 0.727273 | 0.494607 |
| 81 | 5/4/10 8:00 AM | 20 | 20 | 0.772727 | 0.412173 |
| 82 | 5/4/10 9:00 AM | 20 | 20 | 0.772727 | 0.412173 |
| 83 | 5/4/10 10:00 AM | 20 | 20 | 0.772727 | 0.412173 |
| 84 | 5/4/10 11:00 AM | 20 | 20 | 0.772727 | 0.412173 |
| 85 | 5/4/10 12:00 PM | 20 | 20 | 0.772727 | 0.412173 |
| 86 | 5/4/10 1:00 PM | 20 | 20 | 0.772727 | 0.412173 |
| 87 | 5/4/10 2:00 PM | 20 | 20 | 0.772727 | 0.412173 |
| 88 | 5/4/10 3:00 PM | 20 | 20 | 0.772727 | 0.412173 |
| 89 | 5/4/10 4:00 PM | 20 | 20 | 0.772727 | 0.412173 |
| 90 | 5/4/10 5:00 PM | 20 | 20 | 0.772727 | 0.412173 |
| 91 | 5/4/10 6:00 PM | 30 | 40 | 0.444444 | 3.947697 |
| 92 | 5/4/10 7:00 PM | 40 | 40 | 0.444444 | 3.947697 |
| 93 | 5/4/10 8:00 PM | 70 | 70 | 0.727273 | 0.494607 |
| 94 | 5/4/10 9:00 PM | 180 | 180 | 1 | 0 |
| 95 | 5/4/10 10:00 PM | 180 | 180 | 1 | 0 |
| 96 | 5/4/10 11:00 PM | 180 | 180 | 1 | 0 |
| 97 | 5/5/10 12:00 AM | 180 | 180 | 1 | 0 |
| 98 | 5/5/10 1:00 AM | 180 | 180 | 1 | 0 |
| 99 | 5/5/10 2:00 AM | 180 | 180 | 1 | 0 |
| 100 | 5/5/10 3:00 AM | 180 | 180 | 1 | 0 |
| 101 | 5/5/10 4:00 AM | 180 | 180 | 1 | 0 |
| 102 | 5/5/10 5:00 AM | 70 | 70 | 0.6 | 0.725424 |
| 103 | 5/5/10 6:00 AM | 40 | 40 | 0.75 | 0.45339 |
| 104 | 5/5/10 7:00 AM | 30 | 30 | 0.727273 | 0.494607 |
| 105 | 5/5/10 8:00 AM | 20 | 20 | 0.772727 | 0.412173 |
| 106 | 5/5/10 9:00 AM | 20 | 20 | 0.772727 | 0.412173 |

Multi Block Read Time Data

| ID | DATE | SREAD_TIME | SREAD_TIME_PREDICTION | CLAS_DT_1_3_PROB | CLAS_DT_1_3_PCST |
|---|---|---|---|---|---|
| 107 | 5/5/10 10:00 AM | 20 | 20 | 0.772727 | 0.412173 |
| 108 | 5/5/10 11:00 AM | 20 | 20 | 0.772727 | 0.412173 |
| 109 | 5/5/10 12:00 PM | 20 | 20 | 0.772727 | 0.412173 |
| 110 | 5/5/10 1:00 PM | 20 | 20 | 0.772727 | 0.412173 |
| 111 | 5/5/10 2:00 PM | 20 | 20 | 0.772727 | 0.412173 |
| 112 | 5/5/10 3:00 PM | 20 | 20 | 0.772727 | 0.412173 |
| 113 | 5/5/10 4:00 PM | 20 | 20 | 0.772727 | 0.412173 |
| 114 | 5/5/10 5:00 PM | 20 | 20 | 0.772727 | 0.412173 |
| 115 | 5/5/10 6:00 PM | 30 | 40 | 0.444444 | 3.947697 |
| 116 | 5/5/10 7:00 PM | 40 | 40 | 0.444444 | 3.947697 |
| 117 | 5/5/10 8:00 PM | 70 | 70 | 0.727273 | 0.494607 |
| 118 | 5/5/10 9:00 PM | 180 | 180 | 1 | 0 |
| 119 | 5/5/10 10:00 PM | 180 | 180 | 1 | 0 |
| 120 | 5/5/10 11:00 PM | 180 | 180 | 1 | 0 |
| 121 | 5/6/10 12:00 AM | 180 | 180 | 1 | 0 |
| 122 | 5/6/10 1:00 AM | 180 | 180 | 1 | 0 |
| 123 | 5/6/10 2:00 AM | 180 | 180 | 1 | 0 |
| 124 | 5/6/10 3:00 AM | 180 | 180 | 1 | 0 |
| 125 | 5/6/10 4:00 AM | 180 | 180 | 1 | 0 |
| 126 | 5/6/10 5:00 AM | 70 | 70 | 0.6 | 0.725424 |
| 127 | 5/6/10 6:00 AM | 40 | 40 | 0.75 | 0.45339 |
| 128 | 5/6/10 7:00 AM | 30 | 30 | 0.727273 | 0.494607 |
| 129 | 5/6/10 8:00 AM | 20 | 20 | 0.772727 | 0.412173 |
| 130 | 5/6/10 9:00 AM | 20 | 20 | 0.772727 | 0.412173 |
| 131 | 5/6/10 10:00 AM | 20 | 20 | 0.772727 | 0.412173 |
| 132 | 5/6/10 11:00 AM | 20 | 20 | 0.772727 | 0.412173 |
| 133 | 5/6/10 12:00 PM | 20 | 20 | 0.772727 | 0.412173 |
| 134 | 5/6/10 1:00 PM | 20 | 20 | 0.772727 | 0.412173 |
| 135 | 5/6/10 2:00 PM | 20 | 20 | 0.772727 | 0.412173 |
| 136 | 5/6/10 3:00 PM | 20 | 20 | 0.772727 | 0.412173 |
| 137 | 5/6/10 4:00 PM | 20 | 20 | 0.772727 | 0.412173 |
| 138 | 5/6/10 5:00 PM | 20 | 20 | 0.772727 | 0.412173 |
| 139 | 5/6/10 6:00 PM | 30 | 40 | 0.444444 | 3.947697 |
| 140 | 5/6/10 7:00 PM | 40 | 40 | 0.444444 | 3.947697 |
| 141 | 5/6/10 8:00 PM | 70 | 70 | 0.727273 | 0.494607 |
| 142 | 5/6/10 9:00 PM | 180 | 180 | 1 | 0 |
| 143 | 5/6/10 10:00 PM | 180 | 180 | 1 | 0 |
| 144 | 5/6/10 11:00 PM | 180 | 180 | 1 | 0 |
| 145 | 5/7/10 12:00 AM | 180 | 180 | 1 | 0 |
| 146 | 5/7/10 1:00 AM | 180 | 180 | 1 | 0 |
| 147 | 5/7/10 2:00 AM | 180 | 180 | 1 | 0 |
| 148 | 5/7/10 3:00 AM | 180 | 180 | 1 | 0 |
| 149 | 5/7/10 4:00 AM | 180 | 180 | 1 | 0 |
| 150 | 5/7/10 5:00 AM | 70 | 70 | 0.6 | 0.725424 |
| 151 | 5/7/10 6:00 AM | 40 | 40 | 0.75 | 0.45339 |
| 152 | 5/7/10 7:00 AM | 30 | 30 | 0.727273 | 0.494607 |
| 153 | 5/7/10 8:00 AM | 20 | 20 | 0.772727 | 0.412173 |
| 154 | 5/7/10 9:00 AM | 20 | 20 | 0.772727 | 0.412173 |
| 155 | 5/7/10 10:00 AM | 20 | 20 | 0.772727 | 0.412173 |
| 156 | 5/7/10 11:00 AM | 20 | 20 | 0.772727 | 0.412173 |
| 157 | 5/7/10 12:00 PM | 20 | 20 | 0.772727 | 0.412173 |
| 158 | 5/7/10 1:00 PM | 20 | 20 | 0.772727 | 0.412173 |
| 159 | 5/7/10 2:00 PM | 20 | 20 | 0.772727 | 0.412173 |
| 160 | 5/7/10 3:00 PM | 20 | 20 | 0.772727 | 0.412173 |
| 161 | 5/7/10 4:00 PM | 20 | 20 | 0.772727 | 0.412173 |
| 162 | 5/7/10 5:00 PM | 20 | 20 | 0.772727 | 0.412173 |
| 163 | 5/7/10 6:00 PM | 20 | 40 | 0.444444 | 3.947697 |
| 164 | 5/7/10 7:00 PM | 40 | 40 | 0.444444 | 3.947697 |
| 165 | 5/7/10 8:00 PM | 70 | 70 | 0.727273 | 0.494607 |
| 166 | 5/7/10 9:00 PM | 180 | 180 | 1 | 0 |
| 167 | 5/7/10 10:00 PM | 180 | 180 | 1 | 0 |
| 168 | 5/7/10 11:00 PM | 180 | 180 | 1 | 0 |
| 169 | 5/8/10 12:00 AM | 180 | 180 | 1 | 0 |
| 170 | 5/8/10 1:00 AM | 180 | 180 | 1 | 0 |
| 171 | 5/8/10 2:00 AM | 180 | 180 | 1 | 0 |
| 172 | 5/8/10 3:00 AM | 180 | 180 | 1 | 0 |
| 173 | 5/8/10 4:00 AM | 180 | 180 | 1 | 0 |
| 174 | 5/8/10 5:00 AM | 180 | 70 | 0.6 | 0.725424 |
| 175 | 5/8/10 6:00 AM | 180 | 40 | 0.75 | 0.45339 |
| 176 | 5/8/10 7:00 AM | 180 | 30 | 0.727273 | 0.494607 |
| 177 | 5/8/10 8:00 AM | 180 | 20 | 0.772727 | 0.412173 |
| 178 | 5/8/10 9:00 AM | 180 | 20 | 0.772727 | 0.412173 |
| 179 | 5/8/10 10:00 AM | 180 | 20 | 0.772727 | 0.412173 |
| 180 | 5/8/10 11:00 AM | 180 | 20 | 0.772727 | 0.412173 |
| 181 | 5/8/10 12:00 PM | 180 | 20 | 0.772727 | 0.412173 |
| 182 | 5/8/10 1:00 PM | 180 | 20 | 0.772727 | 0.412173 |
| 183 | 5/8/10 2:00 PM | 180 | 20 | 0.772727 | 0.412173 |
| 184 | 5/8/10 3:00 PM | 180 | 20 | 0.772727 | 0.412173 |
| 185 | 5/8/10 4:00 PM | 180 | 20 | 0.772727 | 0.412173 |
| 186 | 5/8/10 5:00 PM | 180 | 20 | 0.772727 | 0.412173 |
| 187 | 5/8/10 6:00 PM | 180 | 40 | 0.444444 | 3.947697 |
| 188 | 5/8/10 7:00 PM | 180 | 40 | 0.444444 | 3.947697 |
| 189 | 5/8/10 8:00 PM | 180 | 70 | 0.727273 | 0.494607 |
| 190 | 5/8/10 9:00 PM | 180 | 180 | 1 | 0 |
| 191 | 5/8/10 10:00 PM | 180 | 180 | 1 | 0 |
| 192 | 5/8/10 11:00 PM | 180 | 180 | 1 | 0 |
| 193 | 5/9/10 12:00 AM | 180 | 180 | 1 | 0 |
| 194 | 5/9/10 1:00 AM | 180 | 180 | 1 | 0 |
| 195 | 5/9/10 2:00 AM | 180 | 180 | 1 | 0 |
| 196 | 5/9/10 3:00 AM | 180 | 180 | 1 | 0 |
| 197 | 5/9/10 4:00 AM | 180 | 180 | 1 | 0 |
| 198 | 5/9/10 5:00 AM | 180 | 70 | 0.6 | 0.725424 |
| 199 | 5/9/10 6:00 AM | 180 | 40 | 0.75 | 0.45339 |
| 200 | 5/9/10 7:00 AM | 180 | 30 | 0.727273 | 0.494607 |
| 201 | 5/9/10 8:00 AM | 180 | 180 | 1 | 0 |
| 202 | 5/9/10 9:00 AM | 180 | 180 | 1 | 0 |
| 203 | 5/9/10 10:00 AM | 180 | 180 | 1 | 0 |
| 204 | 5/9/10 11:00 AM | 180 | 180 | 1 | 0 |
| 205 | 5/9/10 12:00 PM | 180 | 180 | 1 | 0 |
| 206 | 5/9/10 1:00 PM | 180 | 180 | 1 | 0 |
| 207 | 5/9/10 2:00 PM | 180 | 180 | 1 | 0 |
| 208 | 5/9/10 3:00 PM | 180 | 180 | 1 | 0 |
| 209 | 5/9/10 4:00 PM | 180 | 180 | 1 | 0 |
| 210 | 5/9/10 5:00 PM | 180 | 180 | 1 | 0 |
| 211 | 5/9/10 6:00 PM | 180 | 40 | 0.444444 | 3.947697 |
| 212 | 5/9/10 7:00 PM | 180 | 40 | 0.444444 | 3.947697 |
| 213 | 5/9/10 8:00 PM | 180 | 70 | 0.727273 | 0.494607 |
| 214 | 5/9/10 9:00 PM | 180 | 180 | 1 | 0 |
| 215 | 5/9/10 10:00 PM | 180 | 180 | 1 | 0 |
| 216 | 5/9/10 11:00 PM | 180 | 180 | 1 | 0 |
| 217 | 5/10/10 12: AM | 180 | 180 | 1 | 0 |
| 218 | 5/10/10 1:00 AM | 180 | 180 | 1 | 0 |
| 219 | 5/10/10 2:00 AM | 180 | 180 | 1 | 0 |
| 220 | 5/10/10 3:00 AM | 180 | 180 | 1 | 0 |
| 221 | 5/10/10 4:00 AM | 180 | 180 | 1 | 0 |
| 222 | 5/10/10 5:00 AM | 70 | 70 | 0.6 | 0.725424 |
| 223 | 5/10/10 6:00 AM | 40 | 40 | 0.75 | 0.45339 |
| 224 | 5/10/10 7:00 AM | 30 | 30 | 0.727273 | 0.494607 |
| 225 | 5/10/10 8:00 AM | 20 | 20 | 0.772727 | 0.412173 |
| 226 | 5/10/10 9:00 AM | 20 | 20 | 0.772727 | 0.412173 |
| 227 | 5/10/10 10: AM | 20 | 20 | 0.772727 | 0.412173 |
| 228 | 5/10/10 11: AM | 20 | 20 | 0.772727 | 0.412173 |
| 229 | 5/10/10 12: PM | 20 | 20 | 0.772727 | 0.412173 |
| 230 | 5/10/10 1:00 PM | 20 | 20 | 0.772727 | 0.412173 |
| 231 | 5/10/10 2:00 PM | 20 | 20 | 0.772727 | 0.412173 |
| 232 | 5/10/10 3:00 PM | 20 | 20 | 0.772727 | 0.412173 |
| 233 | 5/10/10 4:00 PM | 20 | 20 | 0.772727 | 0.412173 |
| 234 | 5/10/10 5:00 PM | 20 | 20 | 0.772727 | 0.412173 |
| 235 | 5/10/10 6:00 PM | 30 | 40 | 0.444444 | 3.947697 |
| 236 | 5/10/10 7:00 PM | 40 | 40 | 0.444444 | 3.947697 |
| 237 | 5/10/10 8:00 PM | 70 | 70 | 0.727273 | 0.494607 |
| 238 | 5/10/10 9:00 PM | 180 | 180 | 1 | 0 |
| 239 | 5/10/10 10: PM | 180 | 180 | 1 | 0 |
| 240 | 5/10/10 11: PM | 180 | 180 | 1 | 0 |
| 241 | 5/11/10 12: AM | 180 | 180 | 1 | 0 |
| 242 | 5/11/10 1:00 AM | 180 | 180 | 1 | 0 |
| 243 | 5/11/10 2:00 AM | 180 | 180 | 1 | 0 |
| 244 | 5/11/10 3:00 AM | 180 | 180 | 1 | 0 |
| 245 | 5/11/10 4:00 AM | 180 | 180 | 1 | 0 |
| 246 | 5/11/10 5:00 AM | 70 | 70 | 0.6 | 0.725424 |
| 247 | 5/11/10 6:00 AM | 40 | 40 | 0.75 | 0.45339 |
| 248 | 5/11/10 7:00 AM | 30 | 30 | 0.727273 | 0.494607 |
| 249 | 5/11/10 8:00 AM | 20 | 20 | 0.772727 | 0.412173 |
| 250 | 5/11/10 9:00 AM | 20 | 20 | 0.772727 | 0.412173 |

Multi Block Read Time Data

| ID | DATE | SREAD_TIME | SREAD_TIME_PREDICTION | CLAS_DT_1_3_PROB | CLAS_DT_1_3_PCST |
|---|---|---|---|---|---|
| 251 | 5/11/10 10: AM | 20 | 20 | 0.772727 | 0.412173 |
| 252 | 5/11/10 11: AM | 20 | 20 | 0.772727 | 0.412173 |
| 253 | 5/11/10 12: PM | 20 | 20 | 0.772727 | 0.412173 |
| 254 | 5/11/10 1:00 PM | 20 | 20 | 0.772727 | 0.412173 |
| 255 | 5/11/10 2:00 PM | 20 | 20 | 0.772727 | 0.412173 |
| 256 | 5/11/10 3:00 PM | 20 | 20 | 0.772727 | 0.412173 |
| 257 | 5/11/10 4:00 PM | 20 | 20 | 0.772727 | 0.412173 |
| 258 | 5/11/10 5:00 PM | 20 | 20 | 0.772727 | 0.412173 |
| 259 | 5/11/10 6:00 PM | 30 | 40 | 0.444444 | 3.947697 |
| 260 | 5/11/10 7:00 PM | 40 | 40 | 0.444444 | 3.947697 |
| 261 | 5/11/10 8:00 PM | 70 | 70 | 0.727273 | 0.494607 |
| 262 | 5/11/10 9:00 PM | 180 | 180 | 1 | 0 |
| 263 | 5/11/10 10: PM | 180 | 180 | 1 | 0 |
| 264 | 5/11/10 11: PM | 180 | 180 | 1 | 0 |
| 265 | 5/12/10 12: AM | 180 | 180 | 1 | 0 |
| 266 | 5/12/10 1:00 AM | 180 | 180 | 1 | 0 |
| 267 | 5/12/10 2:00 AM | 180 | 180 | 1 | 0 |
| 268 | 5/12/10 3:00 AM | 180 | 180 | 1 | 0 |
| 269 | 5/12/10 4:00 AM | 180 | 180 | 1 | 0 |
| 270 | 5/12/10 5:00 AM | 70 | 70 | 0.6 | 0.725424 |
| 271 | 5/12/10 6:00 AM | 40 | 40 | 0.75 | 0.45339 |
| 272 | 5/12/10 7:00 AM | 30 | 30 | 0.727273 | 0.494607 |
| 273 | 5/12/10 8:00 AM | 20 | 20 | 0.772727 | 0.412173 |
| 274 | 5/12/10 9:00 AM | 20 | 20 | 0.772727 | 0.412173 |
| 275 | 5/12/10 10: AM | 20 | 20 | 0.772727 | 0.412173 |
| 276 | 5/12/10 11: AM | 20 | 20 | 0.772727 | 0.412173 |
| 277 | 5/12/10 12: PM | 20 | 20 | 0.772727 | 0.412173 |
| 278 | 5/12/10 1:00 PM | 20 | 20 | 0.772727 | 0.412173 |
| 279 | 5/12/10 2:00 PM | 20 | 20 | 0.772727 | 0.412173 |
| 280 | 5/12/10 3:00 PM | 20 | 20 | 0.772727 | 0.412173 |
| 281 | 5/12/10 4:00 PM | 20 | 20 | 0.772727 | 0.412173 |
| 282 | 5/12/10 5:00 PM | 20 | 20 | 0.772727 | 0.412173 |
| 283 | 5/12/10 6:00 PM | 30 | 40 | 0.444444 | 3.947697 |
| 284 | 5/12/10 7:00 PM | 40 | 40 | 0.444444 | 3.947697 |
| 285 | 5/12/10 8:00 PM | 70 | 70 | 0.727273 | 0.494607 |
| 286 | 5/12/10 9:00 PM | 180 | 180 | 1 | 0 |
| 287 | 5/12/10 10: PM | 180 | 180 | 1 | 0 |
| 288 | 5/12/10 11: PM | 180 | 180 | 1 | 0 |
| 289 | 5/13/10 12: AM | 180 | 180 | 1 | 0 |
| 290 | 5/13/10 1:00 AM | 180 | 180 | 1 | 0 |
| 291 | 5/13/10 2:00 AM | 180 | 180 | 1 | 0 |
| 292 | 5/13/10 3:00 AM | 180 | 180 | 1 | 0 |
| 293 | 5/13/10 4:00 AM | 180 | 180 | 1 | 0 |
| 294 | 5/13/10 5:00 AM | 70 | 70 | 0.6 | 0.725424 |
| 295 | 5/13/10 6:00 AM | 40 | 40 | 0.75 | 0.45339 |
| 296 | 5/13/10 7:00 AM | 30 | 30 | 0.727273 | 0.494607 |
| 297 | 5/13/10 8:00 AM | 20 | 20 | 0.772727 | 0.412173 |
| 298 | 5/13/10 9:00 AM | 20 | 20 | 0.772727 | 0.412173 |
| 299 | 5/13/10 10: AM | 20 | 20 | 0.772727 | 0.412173 |
| 300 | 5/13/10 11: AM | 20 | 20 | 0.772727 | 0.412173 |
| 301 | 5/13/10 12: PM | 20 | 20 | 0.772727 | 0.412173 |
| 302 | 5/13/10 1:00 PM | 20 | 20 | 0.772727 | 0.412173 |
| 303 | 5/13/10 2:00 PM | 20 | 20 | 0.772727 | 0.412173 |
| 304 | 5/13/10 3:00 PM | 20 | 20 | 0.772727 | 0.412173 |
| 305 | 5/13/10 4:00 PM | 20 | 20 | 0.772727 | 0.412173 |
| 306 | 5/13/10 5:00 PM | 20 | 20 | 0.772727 | 0.412173 |
| 307 | 5/13/10 6:00 PM | 30 | 40 | 0.444444 | 3.947697 |
| 308 | 5/13/10 7:00 PM | 40 | 40 | 0.444444 | 3.947697 |
| 309 | 5/13/10 8:00 PM | 70 | 70 | 0.727273 | 0.494607 |
| 310 | 5/13/10 9:00 PM | 180 | 180 | 1 | 0 |
| 311 | 5/13/10 10: PM | 180 | 180 | 1 | 0 |
| 312 | 5/13/10 11: PM | 180 | 180 | 1 | 0 |
| 313 | 5/14/10 12: AM | 180 | 180 | 1 | 0 |
| 314 | 5/14/10 1:00 AM | 180 | 180 | 1 | 0 |
| 315 | 5/14/10 2:00 AM | 180 | 180 | 1 | 0 |
| 316 | 5/14/10 3:00 AM | 180 | 180 | 1 | 0 |
| 317 | 5/14/10 4:00 AM | 180 | 180 | 1 | 0 |
| 318 | 5/14/10 5:00 AM | 70 | 70 | 0.6 | 0.725424 |
| 319 | 5/14/10 6:00 AM | 40 | 40 | 0.75 | 0.45339 |
| 320 | 5/14/10 7:00 AM | 30 | 30 | 0.727273 | 0.494607 |
| 321 | 5/14/10 8:00 AM | 20 | 20 | 0.772727 | 0.412173 |
| 322 | 5/14/10 9:00 AM | 20 | 20 | 0.772727 | 0.412173 |
| 323 | 5/14/10 10: AM | 20 | 20 | 0.772727 | 0.412173 |
| 324 | 5/14/10 11: AM | 20 | 20 | 0.772727 | 0.412173 |
| 325 | 5/14/10 12: PM | 20 | 20 | 0.772727 | 0.412173 |
| 326 | 5/14/10 1:00 PM | 20 | 20 | 0.772727 | 0.412173 |
| 327 | 5/14/10 2:00 PM | 20 | 20 | 0.772727 | 0.412173 |
| 328 | 5/14/10 3:00 PM | 20 | 20 | 0.772727 | 0.412173 |
| 329 | 5/14/10 4:00 PM | 20 | 20 | 0.772727 | 0.412173 |
| 330 | 5/14/10 5:00 PM | 20 | 20 | 0.772727 | 0.412173 |
| 331 | 5/14/10 6:00 PM | 30 | 40 | 0.444444 | 3.947697 |
| 332 | 5/14/10 7:00 PM | 40 | 40 | 0.444444 | 3.947697 |
| 333 | 5/14/10 8:00 PM | 70 | 70 | 0.727273 | 0.494607 |
| 334 | 5/14/10 9:00 PM | 180 | 180 | 1 | 0 |
| 335 | 5/14/10 10: PM | 180 | 180 | 1 | 0 |
| 336 | 5/14/10 11: PM | 180 | 180 | 1 | 0 |
| 337 | 5/15/10 12: AM | 180 | 180 | 1 | 0 |
| 338 | 5/15/10 1:00 AM | 180 | 180 | 1 | 0 |
| 339 | 5/15/10 2:00 AM | 180 | 180 | 1 | 0 |
| 340 | 5/15/10 3:00 AM | 180 | 180 | 1 | 0 |
| 341 | 5/15/10 4:00 AM | 180 | 180 | 1 | 0 |
| 342 | 5/15/10 5:00 AM | 180 | 70 | 0.6 | 0.725424 |
| 343 | 5/15/10 6:00 AM | 180 | 40 | 0.75 | 0.45339 |
| 344 | 5/15/10 7:00 AM | 180 | 30 | 0.727273 | 0.494607 |
| 345 | 5/15/10 8:00 AM | 180 | 20 | 0.772727 | 0.412173 |
| 346 | 5/15/10 9:00 AM | 180 | 20 | 0.772727 | 0.412173 |
| 347 | 5/15/10 10: AM | 180 | 20 | 0.772727 | 0.412173 |
| 348 | 5/15/10 11: AM | 180 | 20 | 0.772727 | 0.412173 |
| 349 | 5/15/10 12: PM | 180 | 20 | 0.772727 | 0.412173 |
| 350 | 5/15/10 1:00 PM | 180 | 20 | 0.772727 | 0.412173 |
| 351 | 5/15/10 2:00 PM | 180 | 20 | 0.772727 | 0.412173 |
| 352 | 5/15/10 3:00 PM | 180 | 20 | 0.772727 | 0.412173 |
| 353 | 5/15/10 4:00 PM | 180 | 20 | 0.772727 | 0.412173 |
| 354 | 5/15/10 5:00 PM | 180 | 20 | 0.772727 | 0.412173 |
| 355 | 5/15/10 6:00 PM | 180 | 40 | 0.444444 | 3.947697 |
| 356 | 5/15/10 7:00 PM | 180 | 40 | 0.444444 | 3.947697 |
| 357 | 5/15/10 8:00 PM | 180 | 70 | 0.727273 | 0.494607 |
| 358 | 5/15/10 9:00 PM | 180 | 180 | 1 | 0 |
| 359 | 5/15/10 10: PM | 180 | 180 | 1 | 0 |
| 360 | 5/15/10 11: PM | 180 | 180 | 1 | 0 |
| 361 | 5/16/10 12: AM | 180 | 180 | 1 | 0 |
| 362 | 5/16/10 1:00 AM | 180 | 180 | 1 | 0 |
| 363 | 5/16/10 2:00 AM | 180 | 180 | 1 | 0 |
| 364 | 5/16/10 3:00 AM | 180 | 180 | 1 | 0 |
| 365 | 5/16/10 4:00 AM | 180 | 180 | 1 | 0 |
| 366 | 5/16/10 5:00 AM | 180 | 70 | 0.6 | 0.725424 |
| 367 | 5/16/10 6:00 AM | 180 | 40 | 0.75 | 0.45339 |
| 368 | 5/16/10 7:00 AM | 180 | 30 | 0.727273 | 0.494607 |
| 369 | 5/16/10 8:00 AM | 180 | 180 | 1 | 0 |
| 370 | 5/16/10 9:00 AM | 180 | 180 | 1 | 0 |
| 371 | 5/16/10 10: AM | 180 | 180 | 1 | 0 |
| 372 | 5/16/10 11: AM | 180 | 180 | 1 | 0 |
| 373 | 5/16/10 12: PM | 180 | 180 | 1 | 0 |
| 374 | 5/16/10 1:00 PM | 180 | 180 | 1 | 0 |
| 375 | 5/16/10 2:00 PM | 180 | 180 | 1 | 0 |
| 376 | 5/16/10 3:00 PM | 180 | 180 | 1 | 0 |
| 377 | 5/16/10 4:00 PM | 180 | 180 | 1 | 0 |
| 378 | 5/16/10 5:00 PM | 180 | 180 | 1 | 0 |
| 379 | 5/16/10 6:00 PM | 180 | 40 | 0.444444 | 3.947697 |
| 380 | 5/16/10 7:00 PM | 180 | 40 | 0.444444 | 3.947697 |
| 381 | 5/16/10 8:00 PM | 180 | 70 | 0.727273 | 0.494607 |
| 382 | 5/16/10 9:00 PM | 180 | 180 | 1 | 0 |
| 383 | 5/16/10 10: PM | 180 | 180 | 1 | 0 |
| 384 | 5/16/10 11: PM | 180 | 180 | 1 | 0 |
| 385 | 5/17/10 12: AM | 180 | 180 | 1 | 0 |
| 386 | 5/17/10 1:00 AM | 180 | 180 | 1 | 0 |
| 387 | 5/17/10 2:00 AM | 180 | 180 | 1 | 0 |
| 388 | 5/17/10 3:00 AM | 180 | 180 | 1 | 0 |
| 389 | 5/17/10 4:00 AM | 180 | 180 | 1 | 0 |
| 390 | 5/17/10 5:00 AM | 70 | 70 | 0.6 | 0.725424 |
| 391 | 5/17/10 6:00 AM | 40 | 40 | 0.75 | 0.45339 |
| 392 | 5/17/10 7:00 AM | 30 | 30 | 0.727273 | 0.494607 |
| 393 | 5/17/10 8:00 AM | 20 | 20 | 0.772727 | 0.412173 |
| 394 | 5/17/10 9:00 AM | 20 | 20 | 0.772727 | 0.412173 |

-continued

Multi Block Read Time Data

| ID | DATE | SREAD_TIME | SREAD_TIME_PREDICTION | CLAS_DT_1_3_PROB | CLAS_DT_1_3_PCST |
|---|---|---|---|---|---|
| 395 | 5/17/10 10: AM | 20 | 20 | 0.772727 | 0.412173 |
| 396 | 5/17/10 11: AM | 20 | 20 | 0.772727 | 0.412173 |
| 397 | 5/17/10 12: PM | 20 | 20 | 0.772727 | 0.412173 |
| 398 | 5/17/10 1:00 PM | 20 | 20 | 0.772727 | 0.412173 |
| 399 | 5/17/10 2:00 PM | 20 | 20 | 0.772727 | 0.412173 |
| 400 | 5/17/10 3:00 PM | 20 | 20 | 0.772727 | 0.412173 |
| 401 | 5/17/10 4:00 PM | 20 | 20 | 0.772727 | 0.412173 |
| 402 | 5/17/10 5:00 PM | 20 | 20 | 0.772727 | 0.412173 |
| 403 | 5/17/10 6:00 PM | 30 | 40 | 0.444444 | 3.947697 |
| 404 | 5/17/10 7:00 PM | 40 | 40 | 0.444444 | 3.947697 |
| 405 | 5/17/10 8:00 PM | 70 | 70 | 0.727273 | 0.494607 |
| 406 | 5/17/10 9:00 PM | 180 | 180 | 1 | 0 |
| 407 | 5/17/10 10: PM | 180 | 180 | 1 | 0 |
| 408 | 5/17/10 11: PM | 180 | 180 | 1 | 0 |
| 409 | 5/18/10 12: AM | 180 | 180 | 1 | 0 |
| 410 | 5/18/10 1:00 AM | 180 | 180 | 1 | 0 |
| 411 | 5/18/10 2:00 AM | 180 | 180 | 1 | 0 |
| 412 | 5/18/10 3:00 AM | 180 | 180 | 1 | 0 |
| 413 | 5/18/10 4:00 AM |  | 180 | 1 | 0 |
| 414 | 5/18/10 5:00 AM |  | 70 | 0.6 | 0.725424 |
| 415 | 5/18/10 6:00 AM |  | 40 | 0.75 | 0.45339 |
| 416 | 5/18/10 7:00 AM |  | 30 | 0.727273 | 0.494607 |
| 417 | 5/18/10 8:00 AM |  | 20 | 0.772727 | 0.412173 |
| 418 | 5/18/10 9:00 AM |  | 20 | 0.772727 | 0.412173 |
| 419 | 5/18/10 10: AM |  | 20 | 0.772727 | 0.412173 |
| 420 | 5/18/10 11: AM |  | 20 | 0.772727 | 0.412173 |
| 421 | 5/18/10 12: PM |  | 20 | 0.772727 | 0.412173 |
| 422 | 5/18/10 1:00 PM |  | 20 | 0.772727 | 0.412173 |
| 423 | 5/18/10 2:00 PM |  | 20 | 0.772727 | 0.412173 |
| 424 | 5/18/10 3:00 PM |  | 20 | 0.772727 | 0.412173 |
| 425 | 5/18/10 4:00 PM |  | 20 | 0.772727 | 0.412173 |
| 426 | 5/18/10 5:00 PM |  | 20 | 0.772727 | 0.412173 |
| 427 | 5/18/10 6:00 PM |  | 40 | 0.444444 | 3.947697 |
| 428 | 5/18/10 7:00 PM |  | 40 | 0.444444 | 3.947697 |
| 429 | 5/18/10 8:00 PM |  | 70 | 0.727273 | 0.494607 |
| 430 | 5/18/10 9:00 PM |  | 180 | 1 | 0 |
| 431 | 5/18/10 10: PM |  | 180 | 1 | 0 |
| 432 | 5/18/10 11: PM |  | 180 | 1 | 0 |
| 433 | 5/19/10 12: AM |  | 180 | 1 | 0 |

Following the rules set forth above, one may, according to the present invention, also forecast the multi block read time of any given hour and day of the week for a given server. As a result, one may anticipate the optimal SQL execution plan to a scheduled command to be run on that given server as illustrated by FIG. 9 a chart for the SREAD Time for the multi block read times.

Following these examples of FIGS. 8-9, one may forecast the single block read time and multi block read time for any given hour and day of the week for a given server; therefore, according to the present invention one may anticipate the optimal SQL execution plan to a scheduled command to be run on the given server.

As will be understood by those of skill in the art, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for database optimization using a forecast of hardware statistics, comprising:
    receiving, by a computer, a request to prepare a structured language query statement;
    formulating, by the computer, said structured language query statement based on said request;
    analyzing, by the computer, historical hardware statistics data of one or more operating parameters of a database management system for optimization of execution of the structured language query statement;
    determining, by the computer, whether a prediction module of said computer is enabled, said prediction module adapted to create a prediction of future hardware statistics data of said one or more operating parameters of a database management system for a scheduled execution time using a predetermined data mining technique that analyzes said historical hardware statistics data of said database management system;
    creating, by the prediction module of the computer, said prediction as a proactive forecast of said future hardware statistics data for said scheduled execution time;
    formulating, by the computer, a structured language query plan for said structure language query statement;
    optimizing, by the computer, said structured language query plan by adapting said structured language query plan based on said future hardware statistics data; and
    executing, by the computer, said structured language query statement according to said optimized structured language query execution plan at said scheduled execution time.

2. The method of claim 1, further comprising:
    utilizing an algorithm, by the computer, for said step of optimizing, said algorithm being at least one of: related to an estimate average IO seek time for positioning a head into a desired location of a disk, and utilizing numeric field designating times and dates.

3. The method of claim 1, further comprising:
    parsing, by the computer, said structured language query statement, wherein said step of parsing is performed using said future hardware statistics data for said scheduled execution time.

4. The method of claim 1, wherein said step of analyzing, by the computer, said historical hardware statistics data of said one or more operating parameters of said database management system is performed in response to said request to prepare a structured language query statement.

5. The method of claim 1, wherein said step of determining, by the computer, whether a prediction module of said computer is enabled is performed in response to said step of analyzing said historical hardware statistics of said one or more operating parameters.

6. The method of claim 1, wherein said step of creating, by the computer, said prediction of said future hardware statistics data for said scheduled execution time is performed in response to said step of determining, by the computer, whether said prediction module of said computer is enabled.

7. The method of claim 1, further comprising:
    updating said historical hardware statistics in response to said step of determining, by the computer, whether a prediction module of said computer is enabled.

8. The method of claim 1, further comprising:
    storing said structured language query statement according to said optimized structured language query execution plan for later execution at said scheduled execution time.

9. The method of claim 1, wherein the operating parameters include at least one of memory usage, CPU time, transaction per time, sorts per transactions, number of applications, table space fill grade, file system fill grade, transaction log spaced used, lock wait per transaction, disk utilization, and caching.

10. A computer readable medium comprising:
a computer-readable program code stored in a computer-readable storage device, the computer readable program code containing instructions executable by a processor of a computer system to implement a method of database optimization using a forecast of hardware statistics, the method comprising:
receiving a request to prepare a structured language query statement;
formulating said structured language query statement based on said request;
analyzing historical hardware statistics data of one or more operating parameters of a database management system for optimization of execution of the structured language query statement;
determining whether a prediction module of said computer is enabled, said prediction module adapted to create a prediction of future hardware statistics data of said one or more operating parameters of a database management system for a scheduled execution time using a predetermined data mining technique that analyzes said historical hardware statistics data of said database management system;
creating, via said prediction module, said prediction of said future hardware statistics data for said scheduled execution time;
formulating a structured language query plan for said structure language query statement;
optimizing said structured language query plan by adapting said structured language query plan based on said future hardware statistics data;
and
executing said structured language query statement according to said optimized structured language query execution plan at said scheduled execution time.

11. The computer readable medium of claim 10, further comprising:
utilizing an algorithm for said step of optimizing, said algorithm being at least one of: related to an estimate average IO seek time for positioning a head into a desired location of a disk, and utilizing numeric field designating times and dates.

12. The computer readable medium of claim 10, further comprising:
parsing said structured language query statement, wherein said step of parsing is performed using said future hardware statistics data for said scheduled execution time.

13. The computer readable medium of claim 10, wherein said step of analyzing, by the computer, said historical hardware statistics data of said one or more operating parameters of said database management system is performed in response to said request to prepare a structured language query statement.

14. The computer readable medium of claim 10, wherein said step of determining, by the computer, whether a prediction module of said computer is enabled is performed in response to said step of analyzing said historical hardware statistics of said one or more operating parameters.

15. The computer readable medium of claim 10, wherein said step of creating, by the computer, said prediction of said future hardware statistics data for said scheduled execution time is performed in response to said step of determining, by the computer, whether said prediction module of said computer is enabled.

16. The computer readable medium of claim 10, further comprising:
updating said hardware statistics in response to said step of determining, by the computer, whether a prediction module of said computer is enabled.

17. The computer readable medium of claim 10, further comprising:
storing said structured language query statement according to said optimized structured language query execution plan for later execution at said scheduled execution time.

18. A computer system for database optimization using a forecast of hardware statistics, the system comprising:
a central processing unit (CPU);
a memory coupled to said CPU; and
a computer readable storage device coupled to the CPU, the storage device containing instructions executable by the CPU via the memory to implement a method of database optimization using a forecast of hardware statistics, the method comprising the steps of:
receiving a request to prepare a structured language query statement;
formulating said structured language query statement based on said request;
analyzing historical hardware statistics data of one or more operating parameters of a database management system for optimization of execution of the structured language query statement;
determining whether a prediction module of said computer is enabled, said prediction module adapted to create a prediction of future hardware statistics data of said one or more operating parameters of a database management system for a scheduled execution time using a predetermined data mining technique that analyzes said historical hardware statistics data of said database management system;
creating, via said prediction module, said prediction of said future hardware statistics data for said scheduled execution time;
formulating a structured language query plan for said structure language query statement;
optimizing said structured language query plan by adapting said structured language query plan based on said future hardware statistics data;
and
executing said structured language query statement according to said optimized structured language query execution plan at said scheduled execution time.

19. The computer system of claim 18, further comprising:
utilizing an algorithm for said step of optimizing, said algorithm being at least one of: related to an estimate average IO seek time for positioning a head into a desired location of a disk, and utilizing numeric field designating times and dates.

20. The computer system of claim 18, further comprising:
parsing said structured language query statement, wherein said step of parsing is performed using said future hardware statistics data for said scheduled execution time.

* * * * *